US012631032B2

(12) United States Patent
De Keyzer

(10) Patent No.: US 12,631,032 B2
(45) Date of Patent: May 19, 2026

(54) CO-FOAMABLE PVC PLASTISOL COMPOSITION AND CO-FOAMED PVC LAYER FOR FLOOR COVERING

(71) Applicant: Beaulieu International Group NV, Waregem (BE)

(72) Inventor: Daan De Keyzer, Waregem (BE)

(73) Assignee: Beaulieu International Group NV, Waregem (BE)

( * ) Notice: Subject to any disclaimer, the term of this patent is extended or adjusted under 35 U.S.C. 154(b) by 0 days.

(21) Appl. No.: 15/734,749

(22) PCT Filed: Jun. 4, 2019

(86) PCT No.: PCT/EP2019/064558
§ 371 (c)(1),
(2) Date: Dec. 3, 2020

(87) PCT Pub. No.: WO2019/234063
PCT Pub. Date: Dec. 12, 2019

(65) Prior Publication Data
US 2021/0230883 A1 Jul. 29, 2021

Related U.S. Application Data

(60) Provisional application No. 62/680,204, filed on Jun. 4, 2018.

(30) Foreign Application Priority Data

Jul. 20, 2018 (EP) ..................................... 18184851

(51) Int. Cl.
*E04F 15/10* (2006.01)
*B32B 3/30* (2006.01)
(Continued)

(52) U.S. Cl.
CPC .............. *E04F 15/107* (2013.01); *B32B 3/30* (2013.01); *B32B 5/022* (2013.01); *B32B 5/024* (2013.01);
(Continued)

(58) Field of Classification Search
CPC ... E04F 15/107; E04F 13/002; E04F 13/0866; E04F 15/16; E04F 15/105; B32B 3/30;
(Continued)

(56) References Cited

U.S. PATENT DOCUMENTS 3,293,108 A 12/1966 Nairn et al.
3,844,814 A 10/1974 Bettoli et al.
(Continued)

FOREIGN PATENT DOCUMENTS

AU 523994 8/1982
JP 2002524296 A * 8/2002 ............... D06N 1/00
(Continued)

OTHER PUBLICATIONS

Translation of Chang Chong Dae et al; Sep. 2010; KR-100982359-B1 (Year: 2010).*
(Continued)

*Primary Examiner* — Nathan L Van Sell
(74) *Attorney, Agent, or Firm* — HSML P.C.

(57) ABSTRACT

A co-foamable vinyl plastisol composition, a gelled or fused co-foamed vinyl layer, a co-foamed vinyl layer, methods of manufacture of the layer and use of the layer in floor coverings such as sheet vinyl, cushioned vinyl flooring, floor tiles, and laminated planks are described. The co-foaming is preferably a sequential foaming of a single layer such as a single coated layer, such as sequentially applied mechanical foaming or frothing followed by chemical foaming. A co-foamable vinyl plastisol composition is mechanically foamed/frothed before it is applied to a substrate. Once on
(Continued)

300 the substrate, the co-foamable layer can be processed further and is chemically foamed in a later process step.

12 Claims, 6 Drawing Sheets

(51) Int. Cl.

| | |
|---|---|
| *B32B 5/02* | (2006.01) |
| *B32B 5/20* | (2006.01) |
| *B32B 5/24* | (2006.01) |
| *B32B 27/12* | (2006.01) |
| *B32B 27/30* | (2006.01) |
| *D06N 3/00* | (2006.01) |
| *D06N 3/06* | (2006.01) |
| *D06N 7/00* | (2006.01) |
| *E04F 13/00* | (2006.01) |
| *E04F 13/08* | (2006.01) |
| *E04F 15/16* | (2006.01) |

(52) U.S. Cl.
CPC ............... *B32B 5/20* (2013.01); *B32B 5/245* (2013.01); *B32B 27/12* (2013.01); *B32B 27/304* (2013.01); *D06N 3/0047* (2013.01); *D06N 3/005* (2013.01); *D06N 3/06* (2013.01); *D06N 7/0013* (2013.01); *D06N 7/0031* (2013.01); *E04F 13/002* (2013.01); *E04F 13/0866* (2013.01); *E04F 15/16* (2013.01); *B32B 2266/0235* (2013.01); *B32B 2307/724* (2013.01); *B32B 2471/00* (2013.01)

(58) Field of Classification Search
CPC ........... B32B 5/022; B32B 5/024; B32B 5/20; B32B 5/245; B32B 27/12; B32B 27/304; B32B 2266/0235; B32B 2307/724; B32B 2471/00; D06N 3/0047; D06N 3/005; D06N 3/06; D06N 7/0013; D06N 7/0031; C08J 2327/06; C08J 9/30
See application file for complete search history.

(56) References Cited

U.S. PATENT DOCUMENTS

| | | | |
|---|---|---|---|
| 4,288,486 | A | 9/1981 | Ferment et al. |
| 5,082,708 | A | 1/1992 | Kauffman et al. |
| 5,169,704 | A * | 12/1992 | Faust ........................ B44F 7/00 |
| | | | 428/206 |
| 5,501,895 | A | 3/1996 | Finley et al. |
| 6,013,329 | A | 1/2000 | Berenger |
| 2002/0160677 | A1 * | 10/2002 | Loffler ..................... D06N 1/00 |
| | | | 442/180 |
| 2003/0104205 | A1 * | 6/2003 | Brodeur, Jr. ............. B32B 5/18 |
| | | | 428/374 |

FOREIGN PATENT DOCUMENTS

| | | | | |
|---|---|---|---|---|
| WO | WO-2006087426 | A1 * | 8/2006 | ............. D06N 7/006 |
| WO | WO-2016113378 | A1 * | 7/2016 | ........... D06N 7/0081 |
| WO | 2017064260 | A1 | 4/2017 | |
| WO | 2018015357 | A1 | 1/2018 | |

OTHER PUBLICATIONS

English Translation for Schoenmann et al (Year: 2003).*
International Preliminary Report on Patentability for International Application No. PCT/EP2019/064558, dated Dec. 8, 2020, 8 pages.
European Search Report for European Application No. 18 184 851.6, dated Jan. 4, 2019, 7 pages.
International Search Report and Written Opinion for International Application PCT/EP2019/064558, dated Sep. 27, 2019, 11 pages.
Ullmann's Polymers and Plastics, 4 Volume Set: Products and Processes, p. 1578, Wiley-VCR Verlag, Weinheim, 2016.
Office Action issued in the parallel Russian patent application, dated Sep. 23, 2022, with English translation.
Communication issued in European Application No. 19732913.9, dated Sep. 1, 2023.

* cited by examiner

| Sample Number | Total Thickness (mm) | Total Weight (g/m2) | Wear Layer (mm) | Tear Resistance MD (N) | Tear Resistance TD (N) |
|---|---|---|---|---|---|
| 1 | 1.050 | 1143 | 0.37 | 70.7 | |
| 2 | 1.040 | 1128 | 0.35 | | 34.2 |
| 3 | 1.060 | 1163 | 0.38 | 57 | |
| 4 | 1.046 | 1046 | 0.35 | | 59.2 |
| 5 | 1.056 | 1135 | 0.36 | 57.6 | |
| 6 | 1.058 | 1140 | 0.34 | | 58 |
| 7 | 1.070 | 1145 | 0.32 | | |
| 8 | 1.050 | 1126 | 0.37 | | |
| 9 | 1.088 | 1135 | 0.33 | | |
| 10 | 1.100 | 1153 | 0.34 | | |
| total | 1.06 | 1131 | 0.35 | 61.77 | 50.47 |
| Spec sheet | 2.00 | 1240 | 0.2 | 30 | 30 |

Figure 5

| Sample Number | Total Thickness (mm) | Total Weight (g/m2) | Interlayer/T1 (mm) | Topfoam (mm) | Wear Layer (mm) | Backfoam (mm) | Tear Resistance MD (N) | Tear Resistance TD (N) |
|---|---|---|---|---|---|---|---|---|
| 1 | 2.3 | 1380 | | | 0.35 | | 44.4 | |
| 2 | 2.476 | 1409 | | | 0.27 | | | 42.7 |
| 3 | 2.48 | 1437 | 0.39 | 0.81 | 0.34 | 0.86 | 58.1 | |
| 4 | 2.53 | 1461 | | | 0.3 | | | 61 |
| 5 | 2.506 | 1476 | 0.47 | 0.78 | 0.32 | 0.97 | 47.7 | |
| 6 | 2.528 | 1485 | | | 0.29 | | | 58.2 |
| 7 | 2.46 | 1457 | | | 0.26 | | | |
| 8 | 2.522 | 1451 | | | 0.23 | | | |
| 9 | 2.396 | 1392 | 0.43 | 0.86 | 0.3 | 0.56 | | |
| 10 | 2.25 | 1326 | | | 0.25 | | | |
| | 2.44 | 1427 | 0.43 | 0.82 | 0.29 | 0.80 | 50 | 54 |
| Spec sheet | 2.10 | 1530 | | | 0.28 | | 25 | 25 |

Figure 6

| Sample reference | Total Thickness (mm) | Total Weight (g/m2) | Topfoam (mm) | Wear Layer (mm) | Backfoam (mm) | Tear Resistance MD (N) | Tear Resistance TD (N) |
|---|---|---|---|---|---|---|---|
| 1 | 1.312 | 1120 | 0.52 | 0.25 | 0.44 | 27.4 | |
| 2 | 1.312 | 1113 | 0.61 | 0.24 | 0.44 | | 17.4 |
| 3 | 1.362 | 1115 | 0.54 | 0.25 | 0.51 | 27.7 | |
| 4 | 1.324 | 1099 | 0.58 | 0.26 | 0.47 | | 34.2 |
| 5 | 1.406 | 1112 | 0.56 | 0.25 | 0.52 | | |
| 6 | 1.27 | 1087 | 0.48 | 0.25 | 0.48 | | |
| Average | 1.33 | 1108 | 0.55 | 0.25 | 0.48 | 28 | 26 |
| Spec sheet | 1.40 | 1340 | | 0.27 | | >25 | >25 |

Figure 7

| Sample Number | Total Thickness (mm) | Total Weight (g/m2) | Interlayer/T1 (mm) | Topfoam (mm) | Wear Layer (mm) | Tear Resistance MD (N) | Tear Resistance TD (N) |
|---|---|---|---|---|---|---|---|
| 1 | 1.512 | 1140 | | | 0.28 | 34.6 | |
| 2 | 1.58 | 1142 | | | 0.31 | | 45.9 |
| 3 | 1.544 | 1136 | | | 0.26 | 42.2 | |
| 4 | 1.468 | 1135 | | | 0.24 | | 49.2 |
| 5 | 1.524 | 1134 | 0.34 | 0.85 | 0.31 | 30.2 | |
| 6 | 1.564 | 1128 | | | 0.29 | | 42.9 |
| 7 | 1.468 | 1123 | 0.32 | 0.81 | 0.31 | | |
| 8 | 1.478 | 1127 | | | 0.29 | | |
| 9 | 1.578 | 1138 | | | 0.29 | | |
| 10 | 1.524 | 1140 | | | 0.3 | | |
| | 1.52 | 1134 | 0.33 | 0.83 | 0.29 | 36 | 46 |
| Spec sheet | 1.65 | 1430 | | | 0.27 | >25 | >25 |

Figure 8

CO-FOAMABLE PVC PLASTISOL COMPOSITION AND CO-FOAMED PVC LAYER FOR FLOOR COVERING

CROSS-REFERENCE TO RELATED APPLICATIONS

This application is a U.S. National Phase Application filed under 35 U.S.C. § 371 claiming benefit to International Patent Application No. PCT/EP2019/064558, filed Jun. 4, 2019, which claims priority to U.S. Provisional Application No. 62/680,204, filed Jun. 4, 2018 and EP patent application Ser. No. 18/184,851.6, filed Jul. 20, 2018, the contents of these applications being incorporated by reference in their entirety.

The present invention relates to a co-foamable vinyl or PVC plastisol composition, a co-foamed vinyl or PVC layer, methods of manufacture of the layer and use of the layer in floor coverings such as sheet vinyl, cushioned vinyl flooring, floor tiles, laminates, planks, with or without locking mechanisms on the sides thereof. The present invention also relates to a multi-layered sheet suitable as floor or wall covering having co-foamed vinyl or PVC plastisol optionally exhibiting a three-dimensional relief and optionally having a decorative image, to a multi-layered sheet-like substrate suitable for being processed into said sheet, to a process for their manufacture, and to a system for performing said process.

BACKGROUND

A sheet vinyl or cushion vinyl used for flooring typically is constructed from a plurality of functional layers. One of the layers can be a fiber layer such as a synthetic fiber, for example a glass fiber or polyester fiber layer. The fiber layer can be a non-woven. A cushion vinyl flooring product having a nonwoven layer such as a glass fiber or polyester interlayer/support layer, comprises four layers. A first coating of an impregnation layer is applied to the fiber layer. For example, this layer can be a PVC plastisol with a chalk filler, the filler being used to reduce cost. This layer is designed to impregnate the fiber layer such as a glass fiber/polyester fiber support layer. This layer should fill up open space, i.e. fill up the pores in the fiber layer, e.g. between the interlayer fibers, and should make a smooth surface. The next layer is a decor layer coating. This layer, when applied, gives a smooth near white surface suitable for printing. This layer includes a chemical foaming agent to form a "top foam". This layer can be printed with printing inks; e.g. by rotogravure or digital printing. On top of the decor layer coating, one or more wear layers are coated. The wear layer is typically transparent and is applied as a plastisol. To maintain transparency a filler is usually not used. The wear layer is applied on top of the print to protect the print layer from wear and tear. Finally, a backing layer is coated onto the bottom of the fiber layer. This backing layer comprises a plastisol and can include chemical foaming agent to form a "back foam". This backing layer gives a cushion vinyl product a certain thickness and its cushion property, depending on which backing layer is coated. It is not always necessary to apply a back coating to make a cushion vinyl product, but it is needed in case a PVC foam layer is required on the back of the product. Traditionally, the printing of foamed vinyl floorings such as sheet vinyl is produced using rotogravure printing for the deposition of an image or design on the visible surface thereof. Rolls bearing patterns can be used for mechanical embossing and/or a foam inhibitor can be used for chemical embossing of the surface of the flooring product.

Chemical embossing typically employs foaming inhibitor compounds, whereby selected areas of the surface of a foamable polymeric layer are printed with one or more ink compositions containing an agent that inhibits foaming when the material is subjected to a heat treatment. The foamable material is expanding fully in areas where no inhibitor is deposited, and foaming is reduced in areas with inhibitor, thereby creating a foamed layer having a surface with indentations at those areas where the foam inhibitor was applied, as for instance disclosed in U.S. Pat. No. 3,293,108 or U.S. Pat. No. 3,844,814 or WO2018/015357.

SUMMARY OF THE INVENTION

Embodiments of the present invention relate to a co-foamable vinyl or PVC plastisol composition, a gelled or fused co-foamed vinyl or PVC layer, methods of manufacture of the layer and use of the layer in floor coverings such as sheet vinyl, cushioned vinyl flooring, floor tiles, laminated flooring and planks. The co-foaming is preferably a sequential foaming of a single layer such as a single coated layer, such as sequentially applied mechanical foaming or frothing followed by chemical foaming. For example, a co-foamable vinyl or PVC plastisol composition can be mechanically foamed/frothed before it is applied to a substrate. Once on the substrate, the co-foamable layer can be processed further and can be chemically foamed in a later process step. For example, the final co-foamed layer can comprise a solidified froth co-foamed with a chemical foaming of the same layer.

A benefit of the mechanical foam or froth of a plastisol such as a vinyl plastisol is that the air introduced in the PVC plastisol does not complicate the subsequent processes significantly. Compressed air injected in the frothing machine preferably should not contain moisture, which is usually the case since this compressed air is normally dried. On the other hand, a limited amount of water can be an advantage. However, a limited amount of water can be beneficial. Water can help in the process of chemical foaming due to steam formation. The amount of water which can be added in the plastisol is 0.1-1.5%, preferably 0.3-1.0, ideally 0.5% wt % of total plastisol composition. Adding a limited amount of water can improve the impregnation and saturation of the porous layer and can assist in the creation of the backing layer if this is required.

Through the use of this co-foamed layer, the conventional number of layers in flooring product constructions can be reduced, e.g. 3 coating layers can be used instead of 4 while maintaining the same functionality. For example, a single gelled co-foamed layer can be printed, whereas conventional vinyl flooring requires two layers before printing. Also flooring products according to embodiments of the present invention do not necessarily require an additional backing coating layer since the co-foamed layer can have similar or better penetration through a porous support layer and hence forms a thin back coating on the bottom of the product. Saving one coating step reduces the equipment and the material required as well as reducing floor space for that equipment which reduces overhead costs assigned to the product.

Alternatively, more layers may be used for thicker products, e.g. those over 2 mm in thickness. In all the embodiments of the present invention each layer can be preferably co-extensive with all other layers in the finished product.

Other embodiments of the present invention can include flooring products using the co-foamed layer which also include four or more coating product constructions.

Whereas there are always four coatings required to produce a printed cushion vinyl with topfoam and backfoam by conventional methods, embodiments of the present invention can use three coatings. The use of mechanical foaming, sometimes called frothing, before application of a first coating layer to a support layer allows a lower coating weight of the first coating for a given thickness. If knife coating such as knife-over-roll is used, the risk of tears is not increased, since the gap between coating knife and support layer is the same or higher than in traditional cushion vinyl.

According to one aspect, in a first set of embodiments of the present invention, a conventional impregnation layer and decor layer of a traditional sheet vinyl are replaced by one single co-foamed layer. Optionally an additional backing layer can be, and for this aspect preferably is, applied. The top surface of the applied and gelled single co-foamable layer can be printed. The gelled single co-foamable layer can comprise a gelled froth. The single co-foamable layer can be made white, suitable for printing. This intermediate product can be stored and customized later by printing or applying a decorative layer such as an optionally embossed printed foil. The inks of the printing can also include a foam inhibitor which will inhibit chemical foaming of the single co-foamable layer underneath the printing inks, the inhibition having a spatially discontinuous and a variable depth distribution.

Alternatively, an additional decor layer can be provided on the gelled co-foamable layer, e.g. gelled froth. For example, a decorative film with optional embossing can be coated or laminated to the top surface of the co-foamable layer.

A wear layer can be applied to the gelled co-foamable layer, e.g. gelled froth and embossed mechanically. Because the single co-foamable layer is low down in the construction and contains a blowing agent, which can be inhibited by printed inhibitors, a much deeper inhibition can be obtained. This allows for a variety of surface finishes, e.g. a variety of wood like finishes.

In a second set of embodiments, a backing layer and impregnation layer of a traditional sheet vinyl is replaced with the single co-foamed layer on a porous support layer. The single co-foamed layer can be a gelled froth before converting into a solidified froth which is co-foamed with a chemical foam. An additional decor layer can be provided on the gelled co-foamable layer, e.g. gelled froth layer. The decor layer can be printed. The decor layer is preferably white, but other colours may be used depending upon the decoration to be applied.

This intermediate product, e.g. white product, can be stored and customized later by printing. The product for printing does not have to be white—for example to provide a stained wood look a coloured layer may be used, e.g. a brown colour. Examples of printing are digital or rotogravure printing. Alternatively, a decorative film with optional embossing can be laminated to the top surface of the gelled co-foamable layer.

Also, in this embodiment, the inks of the printing can also include a foam inhibitor which will inhibit chemical foaming of the decor layer and/or co-foamable layer underneath the printing inks, the inhibition having a spatially discontinuous and a variable depth distribution. Because the decor layer and/or the single co-foamable layer can contain a chemical blowing agent, and the co-foamed layer lies deep in the construction a much deeper inhibition can be obtained. This allows for a variety of surface finishes, e.g. a variety of wood like finishes.

In a first aspect relating to the first set of embodiments, the present invention relates to a multi-layered sheet suitable as floor or wall covering which can optionally exhibit a three-dimensional surface relief and a decorative image, comprising:

i. a support layer having an upper surface and a lower surface; and
ii. a co-foamed layer having an upper surface and a lower surface, the lower surface of the co-foamed layer provided adjacent to the upper surface of the support layer; wherein the single co-foamed layer replaces the first coating and the decor layer of a conventional vinyl sheet.

In manufacture, after application and gelling, the upper surface of a gelled co-foamable layer can be printed or optionally comprises a printed layer. The gelled co-foamable layer can be a gelled froth. The printing can be digital printing or rotogravure printing, for example. The printing can include a foaming inhibitor printed in a spatially discontinuous manner to generate a chemically embossed relief pattern when a chemical blowing agent is activated in the gelled co-foamable layer. The discontinuous chemically embossed relief pattern can optionally comprise indentations formed by single or stacked dots of a digitally printed material or a rotogravure printed material comprising a foam inhibiting agent.

The support layer can be porous and the co-foamable layer applied to the porous support layer can be at least partially impregnated into the porous support layer. The degree of porosity of the porous support layer will have an effect on the impregnation by the co-foamable layer. A preferred porosity or openness of the porous support layer can give good impregnation and saturation by the co-foamable or hybrid layer. Porosity may be measured by air permeability of the sheet. Air permeability and thickness of the porous layer are preferably:

Air permeability at 100 Pascal, measured according to ISO 9237: at least 1700 $l/m^2 \cdot s$, e.g. 1700 to 2500 $l/m^2 \cdot s$ and preferred is 2200-2500 $l/m^2 \cdot s$ Below 1700 $l/m^2 \cdot s$ is not excluded from the present invention per se, but it is less preferred as too much co-foamable material or hybrid foam would normally need to be coated.

The thickness of the support layer is preferably less than 0.35 mm, with a preferred range of 0.25 mm-0.30 mm or 0.28 mm-0.30 mm. Thinner than 0.24 mm is not excluded from the present invention per se, but it is not preferred as the porous layer probably does not have the required strength and could break.

Selecting an appropriate tensile strength for the porous layer may be useful.

Suitable ranges are 120 to 250 MD, and 80 to 200 CD, preferably 150 to 200 MD and 100 to 150 CD. For example, a tested porous layer with tensile strength of 170 (MD) and 130 (CD) worked excellently well.

Test method for measuring tensile strength is preferably EN 29073 T3*N/5 cm.

With respect to the above values and the amount of co-foamable or hybrid coating applied, for an optimum thickness of porous layer of 0.25 mm to 0.30 mm, the optimum amount of hybrid coating is 450-550 $g/m^2$, e.g. with a minimum of 380 $g/m^2$.

Alternatively, the support layer can be a foil to which the co-foamable layer is applied and adhered. The co-foamable layer can be a froth.

Optionally, a decorative layer can be adhered to the upper surface of the gelled co-foamed layer, e.g. gelled froth. For example, an embossed printed foil can be laminated to the single gelled co-foamable layer.

At least one wear resistant layer can be provided adjacent to the gelled or fused co-foamed layer or to the decorative layer. The wear resistant layer can be made from a transparent plastisol layer applied on top of the printing or decorative layer.

The wear layer can be mechanically embossed. The combination of chemical inhibited chemical blowing of the gelled co-foamable layer and the mechanically embossed wear layer provides an exceptional depth of embossing.

Optionally a lacquer layer can be applied.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemical foaming, e.g. a solidified vinyl froth co-foamed with a chemically foamed vinyl in a single layer.

A backing layer is not required but can be, and preferably is, provided adjacent and adhered to the lower surface of the support layer. The backing layer can be a textile layer such as a woven or non-woven layer including a felt, a fibrous layer wherein the fiber can be a synthetic fiber, a natural fiber such as jute or flax, a mineral fiber such as glass fiber, a polymeric layer such as a vinyl or PVC coating, or a laminated foil. The backing layer can also be a foamed and fused plastisol such as a vinyl or PVC plastisol. The plastisol backing layer can be chemically foamed.

The co-foamed layer comprises a mixed combination of a mechanical foam and a chemically blown foam in one layer, e.g. a solidified froth co-foamed with a chemical foam in a single layer.

The floor covering can comprise a plurality of layers wherein one layer is a vinyl co-foamed layer, the vinyl co-foamed layer comprising a co-foamed mechanical foam and a chemical foam in a single layer e.g. a solidified froth co-foamed with a chemical foam in a single layer.

The support layer can be porous. The porous support layer can be a woven or nonwoven textile layer such as a tissue or scrim, a mesh or a net, or a synthetic fiber layer of which a polyester fiber layer is an example or a mineral fiber layer of which a glass fiber layer is an example. Paper is excluded.

The vinyl co-foamed layer can at least partly impregnate the porous support layer. The degree and easiness with which the porous support layer is impregnated will depend on the porosity of the support layer.

The degree of porosity of the porous support layer will have an effect on the impregnation by the co-foamable layer.

A preferred porosity or openness of the porous support layer can give good impregnation and saturation by the co-foamable or hybrid layer. Porosity may be measured by air permeability of the sheet. Air permeability and thickness of the porous layer are preferably:

Air permeability at 100 Pascal, measured according to ISO 9237: at least 1700 l/m$^2$·s, e.g. 1700 to 2500 l/m$^2$·s and preferred is 2200-2500 l/m$^2$·s.

Below 1700 l/m$^2$·s is not excluded from the present invention per se, but it is less preferred as too much co-foamable or hybrid foam would normally need to be coated.

The thickness of the support layer is preferably less than 0.35 mm, with a preferred range of 0.25 mm-0.30 mm or 0.28 mm-0.30 mm. Thinner than 0.24 mm is not excluded from the present invention per se, but it is not preferred as the porous layer probably does not have the required strength and could break.

Selecting an appropriate tensile strength for the porous layer may be useful.

Suitable ranges are 120 to 250 MD, and 80 to 200 CD preferably 150 to 200 MD and 100 to 150 CD. For example, a tested porous layer with tensile strength of 170 (MD) and 130 (CD) worked excellently well.

Test method for measuring tensile strength is preferably EN 29073 T3*N/5 cm.

With respect to the above values and the amount of co-foamable or hybrid coating applied, for an optimum thickness of porous layer of 0.25 mm to 0.30 mm, the optimum amount of hybrid coating is 450-550 g/m$^2$, e.g. with a minimum of 380 g/m$^2$.

The vinyl co-foamed layer can be made of a gelled or fused mineral filled co-foamed PVC plastisol.

The vinyl co-foamed layer can be a white layer and can be suitable for printing thereon. The printing can comprise printing inks applied by rotogravure or digital printing, for example. The mineral filled vinyl or PVC plastisol can have a mineral filler content.

In a second aspect relating to the second embodiment, the present invention relates to a multi-layered sheet suitable as floor or wall covering which can optionally exhibit a three-dimensional surface relief and a decorative image, comprising:

i. a porous support layer having an upper surface and a lower surface;

ii. a co-foamed layer having an upper surface and a lower surface, the lower surface of the co-foamed layer being provided adjacent to the porous support layer. The co-foamable layer is impregnated into the porous support layer. The lower surface of the co-foamed layer can be provided adjacent to the upper surface of the porous support layer, and from there impregnated into and through the porous support layer to form a combined gelled co-foamable backing-impregnating layer.

The single co-foamed layer replaces the first coating and the backing layer of a conventional vinyl sheet. The degree and easiness with which the porous support layer is impregnated will depend on the porosity of the support layer. After application of a co-foamable layer and gelling, a decor layer can be coated onto the upper surface of the gelled co-foamable layer. The gelled co-foamable layer can be a gelled froth. The decor layer can be printed or optionally comprise a printed layer. The printing can be digital printing or rotogravure printing. The printing can include a foaming inhibitor printed in a spatially discontinuous manner to generate a chemically embossed relief pattern when the chemical blowing agent is activated in the gelled co-foamable layer and/or the decor layer. The discontinuous chemically embossed relief pattern can optionally comprise indentations formed by single or stacked dots of a digitally printed material or a rotogravure printed material comprising a foam inhibiting agent.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

Optionally, a decorative layer can be adhered to the upper surface of the gelled co-foamed layer. For example, an embossed printed foil can be laminated to the gelled single co-foamable layer.

At least one wear resistant layer can be provided adjacent to the gelled co-foamable layer or the decorative layer. The wear resistant layer can be made from a transparent plastisol layer applied on top of the printing. The wear layer can be mechanically embossed. The combination of chemical inhibited chemical blowing of the gelled co-foamable layer and the mechanically embossed wear layer provides an exceptional depth of embossing.

A backing layer is not required as it can be provided by the co-foamable layer impregnating the porous support layer followed by gelling, fusing and chemical blowing of the co-foamable layer. The degree and easiness with which the porous support layer is impregnated will depend on the porosity of the support layer. The co-foamable layer can be a froth. Especially the chemical blowing creates a thin backing layer. An additional backing layer can be applied adhered to the lower surface of the porous support layer. The additional backing layer can be a woven or nonwoven textile layer such as a tissue or scrim, a mesh or a net, or a synthetic fiber layer of which a polyester fiber layer is an example or a mineral fiber of which a glass fiber layer is an example. The additional backing layer can be applied as a vinyl such as PVC plastisol and gelled and fused.

The porous support layer can be a woven or nonwoven textile layer such as a tissue or scrim, a mesh or a net, or a synthetic fiber layer of which a polyester fiber layer is an example or a mineral fiber of which a glass fiber layer is an example, whereby paper is excluded.

The co-foamed layer comprises a mixed combination of a mechanical foam and a chemically blown foam in one layer. The vinyl co-foamed layer can be made from a gelled and fused mineral filled co-foamable vinyl or PVC plastisol. The vinyl co-foamed layer can be a solidified vinyl froth co-foamed with a chemically foamed vinyl in a single layer.

In a third aspect, the present invention relates to a multi-layered sheet-like substrate suitable for being processed into a multi-layered sheet according to the first aspect, comprising:

i. a support layer having an upper surface and a lower surface, ii. a gelled co-foamable layer having an upper surface and a lower surface, the lower surface of the gelled co-foamable layer being provided adjacent to the upper surface of the support layer; and iii. optionally a discontinuous chemical embossing pattern comprising single or stacked dots of a digitally printed material or a rotogravure printed material comprising a foam inhibiting agent provided on the upper surface of the gelled co-foamable layer, and optionally, iv. printing applied to the gelled co-foamable layer.

Alternatively, a decorative layer can be adhered to the upper surface of the gelled co-foamable layer. The decorative layer can be a printed and optionally embossed foil laminated to the upper surface of the gelled co-foamable layer.

Alternatively, a backing layer can be applied.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

In a fourth aspect, the present invention relates to a multi-layered sheet-like substrate suitable for being processed into a multi-layered sheet according to the second aspect, comprising:

i. a porous support layer having an upper surface and a lower surface, ii. a gelled co-foamable layer having an upper surface and a lower surface, the lower surface of the gelled co-foamable layer being provided adjacent to the upper surface of the porous support layer;

iii a decor layer applied to the upper surface of the gelled co-foamable layer, the decor layer optionally having a discontinuous chemical embossing pattern comprising single or stacked dots of a digitally printed material or a rotogravure printed material comprising a foam inhibiting agent provided on the upper surface of the gelled co-foamable layer, and optionally, iv. printing applied to the gelled co-foamable layer.

Alternatively, a decorative layer can be adhered to the upper surface of the gelled co-foamable layer. The decorative layer can be a printed and optionally embossed foil laminated to the upper surface of the gelled co-foamable layer.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

In a fifth aspect, the present invention relates to a floor or wall panel comprising:

i. a base panel; and ii. the multi-layered sheet of the first aspect or the second aspect as a top layer adjacent and adhered to the base panel, wherein one of the layers is a co-foamed layer. In the final product the co-foamed layer can be a solidified froth such as a solidified vinyl froth co-foamed with a chemically foamed vinyl in a single layer.

In a sixth aspect, the present invention relates to a process of preparing the substrate or the sheet according to the first or second aspects, comprising the steps of:

i. providing a support layer having an upper surface and a lower surface; and ii. forming and gelling a co-foamable layer to the upper surface of the support layer, the gelled co-foamable layer comprising a mechanical foam;

iii. optionally printing on to the gelled co-foamable layer, optionally applying a discontinuous chemical embossing pattern comprising single or stacked dots of a digitally printed material or a rotogravure printed material comprising a foam inhibiting agent on the upper surface of the co-foamable layer, and optionally, iv. applying a decorative layer to the upper surface of the co-foamable layer with or without the chemical embossing pattern.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

In a seventh aspect, the present invention also relates to a co-foamable composition comprising: at least two different types of vinyl material or PVC in a plastisol, a first vinyl material or PVC type being for mechanical foaming and a second vinyl material or PVC type for chemical blowing with a chemical blowing agent. In the final product the co-foamed layer can be a solidified froth such as a solidified vinyl froth co-foamed with a chemically foamed vinyl in a single layer.

Embodiments of the present invention provide a multi-layered sheet suitable as floor or wall covering, comprising:

i. a support layer having an upper surface and a lower surface;

ii. a co-foamed vinyl layer having an upper surface and a lower surface, the lower surface of the co-foamed layer being provided adjacent to the support layer.

In the final product the co-foamed layer can be a solidified froth such as a solidified vinyl froth co-foamed with a chemically foamed vinyl in a single layer.

The support layer is porous which allows the co-foamed vinyl layer to be at least partially impregnated into the upper surface of the support layer. The degree and easiness with which the porous support layer is impregnated will depend on the porosity of the support layer. Tensile strength of the porous layer is preferably in the range:

120 to 250 MD, and 80 to 200 CD, preferably 150 to 200 MD and 100 to 150 CD tested according to EN 29073 T3*N/5 cm. For example, a tested porous layer with tensile strength of 170 (MD) and 130 (CD) worked excellently well.

For optimum thickness of porous layer, a preferred amount of co-foamable or hybrid coating is 450-550 g/m$^2$ preferably with a minimum of 380 g/m$^2$. A preferred range for co-foamable or hybrid coating in relation to preferred thicknesses is 0.25-0.30 mm thickness which preferably requires >380 up to 550 g/m$^2$, preferably in the range 450-550 g/m$^2$ coating.

This provides a greater strength and allows the vinyl layer to penetrate through the support layer and form a backing.

An upper surface of the co-foamed vinyl layer can comprise a discontinuous chemically embossed relief pattern, this provides a way of customising the embossing especially when the discontinuous chemically embossed relief pattern comprises indentations formed by single or stacked dots of a digitally printed material or a rotogravure printed material comprising a foam inhibiting agent.

A decorative layer can be adhered to the upper surface of the co-foamed vinyl layer as an alternative.

Preferably, the co-foamed vinyl layer is a white gelled plastisol layer suitable for printing thereon. This allows the white intermediate product to be stored and customized only when needed. The printing can comprise printing inks applied by rotogravure or digital printing. These forms of printing are suitable for use with sheet materials of this nature.

At least one wear resistant layer is provided on the decorative layer. This improves wear resistance. At least one wear resistant layer is provided in the multilayered sheet above the co-foamed vinyl layer.

The wear resistant layer can be a transparent gelled plastisol layer applied on top of the printing. This is economical as the same equipment can be used for coating.

The wear resistant layer is mechanically embossed which in combination with inhibition provides deeper embossing.

A backing layer can be provided adjacent and adhered to the lower surface of the support layer. This increases the thickness of the product giving better feel.

The co-foamed vinyl layer is impregnated in the support layer to form a backing. This allows formation of a backing without needing a separate layer. The degree and easiness with which the porous support layer is impregnated will depend on the porosity of the support layer.

A three-dimensional surface relief and a decorative image can be provided which gives a natural look, e.g. for wood finishes.

The co-foamed vinyl layer can comprise a mixed combination of a mechanical foam and a chemically blown foam in one layer. This allows a reduction in weight of the layer for a given thickness.

The mechanical foam is any foam obtained by mechanical means, by agitation, whipping, or frothing. This allows optimum processing.

The co-foamed vinyl layer comprises a gelled and fused vinyl or PVC plastisol. This allows combination with chemical blowing so that the co-foamed vinyl layer is a gelled and fused plastisol that has been mechanically foamed and chemically blown by a chemical foaming agent.

The support layer can comprise natural, synthetic fibers or mineral fibers. This allows the best fibers for and application to be chosen.

The support layer can comprise a mesh or a net or a woven or nonwoven textile layer. This allows the best support layer for an application to be chosen.

The co-foamed vinyl layer can comprise a mineral filler. This lowers material cost.

The co-foamed layer preferably has a weight of 100 gsm to 600 gsm, more preferably from 200 gsm to 400 gsm and most preferably from 250 gsm to 300 gsm or 250-350 gsm. This allows the weight to be optimized to the application.

Embodiments of the present invention provide a floor covering comprising a plurality of layers wherein one layer is a vinyl co-foamed gelled and fused plastisol layer, wherein the vinyl co-foamed gelled plastisol layer is a combination of co-foamed mechanical and chemical foams in one layer. Combining these layers together to form one layer which is co-foamed is economical.

The floor covering can comprise a support layer, the vinyl co-foamed gelled and fused plastisol layer having an upper surface and a lower surface, the lower surface being provided adjacent to, and at least partially impregnated into the upper surface of the support layer. The degree and easiness with which the porous support layer is impregnated will depend on the porosity of the support layer. The support layer provides mechanical strength. Tensile strength of the porous layer may preferably be in the range as tested according to EN 29073 T3*N/5 cm: 120 to 250 MD, and 80 to 200 CD, preferably 150 to 200 MD and 100 to 150 CD. For example, a tested porous layer with tensile strength of 170 (MD) and 130 (CD) worked excellently well.

The support layer can comprise natural, synthetic or mineral fibers. This provides reinforcing while leaving the support layer porous. The support layer can be a woven or nonwoven textile layer. This is a convenient way to deliver the fibers to this layer and to make the support layer porous.

The porous support layer can comprise a woven or nonwoven textile layer such as a tissue or scrim, a mesh or a net, or a synthetic fiber layer of which a polyester fiber layer is an example or a mineral fiber layer of which a glass fiber layer is an example. Paper is excluded.

The vinyl co-foamed plastisol layer can comprise a gelled and fused mineral filled co-foamed vinyl or PVC plastisol layer. This provides a strong but economical layer.

The vinyl co-foamed plastisol layer can be a white layer and is adapted for printing thereon. This can be stored as a white layer and printed or decorated as required.

The printing can comprise printing inks applied by rotogravure or digital printing. These are convenient printing techniques.

A wear resistant layer can be applied on top of the printing. This provides a tougher product. The wear layer can be a gelled and fused transparent plastisol layer. This allows a coating using the same equipment as other layers.

A backing layer can be provided which increases thickness weight and feel. The backing layer is a gelled and fused foamed plastisol. This allows a coating using the same equipment as other layers. The gelled and fused foamed plastisol backing layer can be chemically foamed. This is useful as the temperature used can fuse the plastisol.

The floor covering can be used as a sheet vinyl, cushioned vinyl flooring, floor tiles, laminates, planks, with or without locking mechanisms on the sides thereof.

Embodiments of the present invention provide a multi-layered sheet substrate suitable for being processed into a multi-layered sheet, comprising:

a support layer having an upper surface and a lower surface, a co-foamable vinyl layer having an upper surface and a lower surface, the lower surface of the co-foamable vinyl layer being provided adjacent to the upper surface of the support layer.

Embodiments of the present invention provide a floor or wall panel comprising: a base panel; and a multi-layered sheet as a top layer adjacent and adhered to the base panel, Embodiments of the present invention provide a process of preparing a multilayer sheet, comprising the steps of:

providing a support layer having an upper surface and a lower surface; and forming a vinyl co-foamable layer on the upper surface of the support layer, the lower surface of the vinyl co-foamed layer being provided adjacent to the support layer.

The process can include at least partially impregnating the vinyl co-foamable layer into the upper surface of the support layer.

The process can include applying a discontinuous chemical embossing pattern comprising single or stacked dots of a digitally printed material or a rotogravure printed material comprising a foam inhibiting agent on the upper surface of the vinyl co-foamable layer.

The process can include applying a decorative layer to the upper surface of the vinyl co-foamable layer comprising the chemical embossing pattern.

The process can include chemical embossing of the co-foamed layer.

Embodiments of the present invention provide a co-foamable composition comprising at least two different types of vinyl material or PVC in a plastisol, a first vinyl material or PVC type being for mechanical foaming and a second vinyl material or PVC type for chemical blowing with a chemical blowing agent.

BRIEF DESCRIPTION OF THE DRAWINGS

FIG. 4 shows a cross section through a sheet product according to an embodiment of the present invention.

FIGS. 5 and 6 are tables of measurements on a sheet product according to the first embodiment.

12

Figure 1:
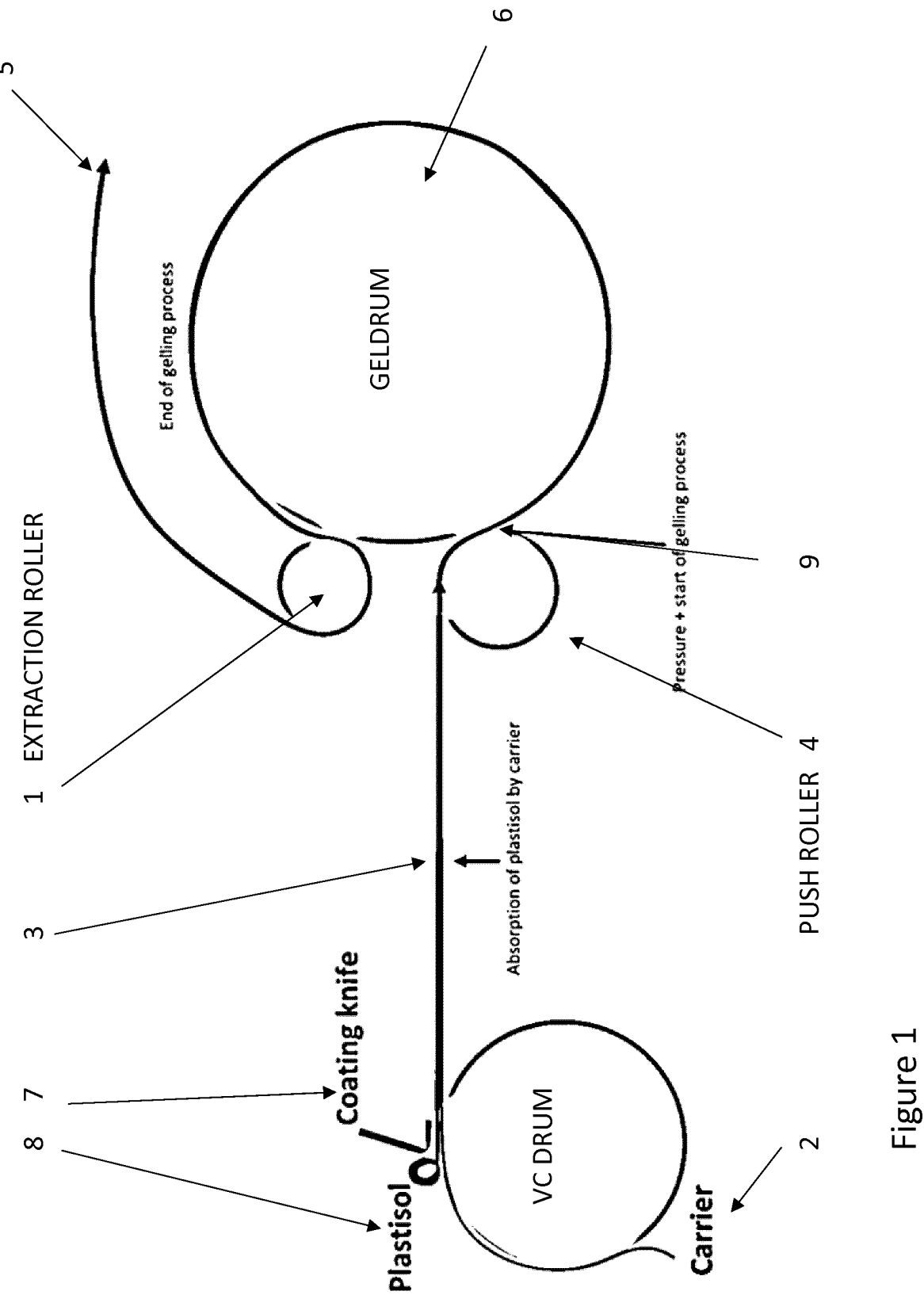
FIG. 1 shows a part of a processing plant in accordance with an embodiment of the present invention.

FIGS. 7 and 8 are tables of measurements on a sheet product according to the second embodiment.

DEFINITIONS

Co-Foamable or Co-Foamed Layer

A co-foamable or co-foamed layer is defined as follows:

Co-foamable plastisol is a liquid comprising a plasticizer and rigid polymeric particles such as vinyl or PVC particles suspended in the plasticizer.

Frothed co-foamable layer is a co-foamable plastisol which has been mechanically foamed or frothed. A "Mechanical foam" means any foam obtained by mechanical means, for example by agitation, whipping, frothing, gas injection, i.e. without the activation of a chemical foaming agent. A benefit of the mechanical foam or froth of a plastisol such as a vinyl plastisol is that the air introduced in the PVC plastisol does not complicate the subsequent processes significantly. Compressed air injected in the frothing machine preferably should not contain moisture, which is usually the case since this compressed air is normally dried. However, a limited amount of water can be beneficial. Water can help in the process of chemical foaming due to steam formation. The amount of water which can be added in the plastisol is 0.1-1.5%, preferably 0.3-1.0, ideally 0.5% wt % of total plastisol composition. Adding a limited amount of water can improve the impregnation and saturation of the porous layer and can assist in the creation of the backing layer if this is required.

A gelled co-foamable layer is a co-foamable plastisol which has been frothed and gelled at a temperature below 200° C. e.g. between 60° C. and 150° C. up to 170° C., and which can still be fused and also chemically foamed as the gelling temperature and time is below the fusion temperature and time and below the activation temperature of a chemical blowing agent in the gelled co-foamed layer. The gelling time and temperature should be set so that the chemical blowing agent in the plastisol is not activated. This may require a temperature below 150° C. such as a temperature down to 140° C. Non-standard processing such as caused by line stoppages may need to be dealt with separately. The chemical blowing agent is preferably a blowing agent such as AZO which does not produce water/steam when blown. With respect to a co-foamable or hybrid coating as disclosed in the present invention, a limited amount of water can be added or generated internally in addition to any chemically blowing agent such as AZO. A limited amount of water can help in the process of chemical foaming due to steam formation at the temperature at which chemical foaming is carried out.

The amount of water which can be added or generated internally in the plastisol is 0.1-1.5%, preferably 0.3-1.0, ideally about 0.5% wt % of total plastisol composition. Adding or generating internally a very limited amount of water can improve the impregnation and saturation of the porous layer and creation of the backing layer.

The blowing gas can be nitrogen, carbon dioxide or similar, for example. In the gelled state granular morphology is lost as is tackiness.

Fused and chemically blown co-foamed layer has been held at a temperature above the gelling temperature to activate the chemical blowing agent to cause chemical blowing and to fuse the plastisol. The temperature is typically 180° C. to 220° C. In this state the co-foamed layer has achieved ductility and other tensile properties.

The co-foamed layer can also be a vinyl or PVC plastisol that has been first mechanically blown and then later chemically blown by a chemical blowing agent and processed at a temperature which fuses the gelled plastisol, e.g. in a temperature range of 180° C. to 220° C.

Hence, the co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

Percentages in Formulations

% in any formulations is weight % of the total formulation. For example, for BL45, it is the weight % of that mix in the total formulation. One can split up to the ingredient % level by for example:

If BL45=10 wt % in total formulation, and AZO powder is 50% of BL45.

The % of AZO in the total formulation, is 0.5 of 10%, being 5 wt %.

Vinyl

The term "vinyl" includes a vinyl polymer selected from the group comprising or consisting of polyvinyl chloride, polyvinylidene chloride, copolymers of vinyl chloride and vinylidene chloride and copolymers of at least 50% by weight of at least one monomer selected from the group consisting of vinyl chloride and vinylidene chloride. The composition can include at least one copolymerizable ethylenically unsaturated monomer, other than said vinyl chloride or vinylidene chloride, having from 2 to 14 carbon atoms. That can include vinyl containing thermoplastics such as polyvinyl acetate, polyvinyl alcohol, polyvinyl butyral and other vinyl and vinylidene resins and copolymers thereof. The co-foamable composition can include two or more different vinyl thermoplastic polymers, e.g. Mixtures of any of the above-mentioned polymers are also included within this definition.

Support Layer

The term "support layer" can include porous and nonporous support layers. The support layer can include fibers in a non-woven, or woven, meshed, or knitted layer excluding paper. The fibers can be in the form of threads or yarns and can be natural, mineral or synthetic fibers or a mixture thereof. They should be able to withstand the chemical blowing temperature e.g. 180° C. to 220° C. Examples of such yarns are those from silk, cotton, nylon, acrylics, polyester, polyvinyl chloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like. Glass fibers may be blended or woven with the natural and/or synthetic fibers. These fibers or yarns can contain fire retardants, antistatic agents, bacteriostats, antidegradants, dyes, pigments, optical brighteners and similar.

The degree of porosity of a porous support layer will have an effect on the impregnation by the co-foamable layer or other liquid material. A preferred porosity or openness of the porous support layer can give a satisfactory or good impregnation and saturation by the co-foamable or hybrid layer. Porosity may be measured by air permeability of the sheet. Air permeability and thickness of the porous layer are preferably:

Air permeability at 100 Pascal, measured according to ISO 9237: at least 1700 l/m²·s, e.g. 1700 to 2500 l/m²·s and preferred is 2200-2500 l/m²·s.

Below 1700 l/m²·s is not excluded from the present invention per se, but it is less preferred as too much cofoamable material or hybrid foam material would normally need to be coated.

Non-Woven

The following text been proposed to the International Standardization Organization by EDANA and INDA:

"A nonwoven is a sheet of fibres, continuous filaments, or chopped yarns of any nature or origin, that have been formed into a web by any means, and bonded together by any means, with the exception of weaving or knitting.

Felts obtained by wet milling are not nonwovens.

Wetlaid webs are nonwovens provided they contain a minimum of 50% of man-made fibres or other fibres of non-vegetable origin with a length to diameter ratio equals or superior to 300, or a minimum of 30% of man-made fibres with a length to diameter ratio equals or superior to 600, and a maximum apparent density of 0.40 g/cm³.

Composite structures are considered nonwovens provided their mass is constituted of at least 50% of nonwoven as per to the above definitions, or if the nonwoven component plays a prevalent role.

In this application paper is not considered to meet the requirements of a non-woven fabric or textile.

Use of Water for Foaming

With respect to a co-foamable or hybrid coating as disclosed in the present invention, a limited amount of water can be added or generated internally in addition to any chemically blowing agent such as AZO. A limited amount of water can help in the process of chemical foaming due to steam formation at the temperature at which chemical foaming is carried out.

The amount of water which can be added or generated internally in the plastisol is 0.1-1.5%, preferably 0.3-1.0, ideally about 0.5% wt % of total plastisol composition. Adding or generating internally a very limited amount of water can improve the impregnation and saturation of the porous layer and creation of the backing layer.

Details of the Illustrative Embodiments of the Present Invention

Embodiments of the present invention make use of a co-foamed layer, especially a vinyl co-foamed layer. The co-foamed layer may take on two functionalities usually associated with two separate layers. The co-foaming can be foamed by mechanical foaming (frothing) and chemical blowing. A co-foaming composition can be mechanically foamed/frothed before being applied to a support layer to create a single co-foamable layer. The co-foaming composition can be a plastisol, e.g. a vinyl plastisol. After application to the support layer of the frothed co-foaming composition, the co-foamable layer is gelled and then later in the process is chemically foamed/blown to form the co-foamed layer. The application of the first frothed foam (mechanically foamed) is carried out while the plastisol is liquid. The temperature of the plastisol is preferably lower than the gelling temperature e.g. below 50° C. preferably 39° C. or lower, to avoid the plastisol starting to gel, and to allow the plastisol to be coated by knife over a roll. For chemical blowing of vinyl material or PVC azodicarbonamide can be used. Blowing agents which foam at different temperatures than azodicarbonamide can also be used, provided that they do not emit water in large quantities when they foam. A limited amount of water can be added or can be generated internally in addition to any chemically blowing agent such as AZO. Water in limited quantities can help in the process of chemical foaming due to steam formation at the temperature at which chemical foaming happens.

The amount of water which can be added or generated in the plastisol is 0.1-1.5%, preferably 0.3-1.0, ideally about 0.5% wt % of total plastisol composition. Adding a very limited amount of water can improve the impregnation and saturation of the porous layer and creation of the backing layer.

In one aspect, a first set of embodiments of the present invention relate to a multi-layered sheet suitable as floor or wall covering which can optionally exhibit a three-dimensional surface relief and a decorative image, wherein what has been conventionally applied to a support layer, i.e. application of an impregnation layer and a decor layer, is replaced by one single co-foamable or co-foamed layer. This set of embodiments generates a co-foamable and finally a co-foamed combined decor-impregnating layer. Printing can be applied directly to the gelled co-foamable combined decor-impregnating layer. In a later stage, the gelled co-foamable combined decor-impregnating layer is heated to activate the chemical blowing agent thereby to blow and complete the co-foamed layer. At the same time the co-foamable layer can be fused. On the bottom side of such a product a backing layer can be and preferably is applied.

The first set of embodiments can provide a multi-layered sheet suitable as floor or wall covering which can have an upper embossed layer. The embossing can be created by using spatially discontinuous inhibition of chemical foaming of the combined co-foamed impregnating-decor layer. Because the combined impregnating-decor layer contains a blowing agent and is quite deep in the structure, a much deeper inhibition can be obtained. Also, and alternatively, the embossing can be created by an embossing roller applied to a wear layer either alone or in combination with inhibited chemical blowing.

Accordingly, the present invention in the first set of embodiments relates to a multi-layered sheet suitable as floor or wall covering which can optionally exhibit a three-dimensional surface relief and a decorative image, comprising:

i. a support layer having an upper surface and a lower surface;

ii. a co-foamed layer having an upper surface and a lower surface, the lower surface of the co-foamed layer being provided adjacent to the upper surface of the support layer, and the co-foamed layer being impregnated into the upper surface of the support layer to form a combined decor-impregnating layer. The co-foamed layer combines the functionality of an impregnating layer as well as combining with the support layer and also providing a surface suitable for printing. The upper surface of the combined co-foamable decor-impregnating layer can optionally comprise a discontinuous chemically embossed relief pattern, wherein the discontinuous chemically embossed relief pattern can optionally comprise indentations formed by single or stacked dots of a digitally printed material or a rotogravure printed material comprising a foam inhibiting agent;

iii. the upper surface of the combined decor-impregnating layer can optionally comprise a printed design as well as a discontinuous chemically embossed relief pattern. Optionally and preferably at least one wear resistant layer can be provided adjacent to the i.e. on the combined decor-impregnating layer. The wear layer can be mechanically embossed.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

A backing layer provided adjacent to and adhered to the lower surface of the support layer can be and preferably is provided.

In the above embodiment, due to the openness of a typical porous support layer and the fibers from which it is made, it is currently believed that it is not possible to coat only the decor layer directly onto the support layer. It is thought that this would result in an uneven/unsmooth coating resulting in poor quality printing such as printing with white spots and/or a blurred print. This is because the coating is absorbed or penetrates in an irregular manner into the support layer, e.g. a mineral or synthetic fiber layer (of which a glass fiber or polyester support layer are examples) before the coating is pre-gelled. Embodiments of the present invention provide a co-foamable layer on the support layer whereby the two foaming actions are preferably performed sequentially in time and at different temperatures. For embodiments of the present invention, a decor layer can be provided by means of the gelled co-foamable layer. This latter is mechanically foamed or frothed before application to the support layer, whereby the coating not only preferably penetrates into the top surface of the support layer, but also allows for a smooth top surface which can be printed on. This is a consequence of the formulation of materials and processing such as on a gelling drum.

It has been found that a mechanically foamed and gelled co-foamable layer can act as a combined decor-impregnating layer while also providing a higher penetration into a porous support layer, without affecting the smoothness of the top surface of the gelled co-foamable layer and thus without affecting the top print quality. A coated plastisol formulation can be used for the co-foamable layer according to embodiments of the present invention. The plastisol formulation provides a higher penetration and, preferably, has a lower filler load in the mechanically foamed co-foamable layer which also functions as a decor layer when compared with a non-mechanically foamed impregnation layer. The reduced filler content allows the plastisol to penetrate better in the interlayer pores (e.g. pores between mineral or synthetic fibers in the support layer, such as glass fibers or PET fibers). For example, during pressure application using a push roller, a frothed co-foamable layer according to embodiments of the present invention can penetrate more deeply into the porous support layer. Without being limited by theory, the reason why the mechanically foamed co-foamable layer penetrates better and still allows for a coating with a smooth top surface which can be printed on, can be explained by the absorption rate of the plastisol into the support layer before it is gelled. Due to the very high weight density, a standard impregnation layer has a different absorption on the support layer compared to a mechanically foamed co-foamable layer which has a lower weight density according to embodiments of the present invention. This density can be 40 to 50% of the conventional density.

With reference to FIG. 1, the mechanically foamed co-foamable layer (3) allows the coating to stay more on the top surface of the support layer (2), before being gelled at a push roller (4) and on the gel drum (6) and gap (9). Once it is under pressure the plastisol (8) penetrates easier through the support layer (2) due to the reduced filler amount, while still giving a smooth top surface. This can be controlled by means of the pressure applied by the push roller (4) on the gel drum (6) to achieve the balance between penetration amount and smooth top coating, and by means of setting the coating weight.

Measured results for this first embodiment made with the first co-foamable formulation are given in FIGS. 5 and 6. FIG. 5 shows a construction made with the formulations from embodiment 1. MD and TD refer to machine direction and transverse direction. A backing layer has not been deposited. The actual measured values compared to spec sheet values show that less materials are used but performance is good.

FIG. 6 shows a construction of this first embodiment with backing layer made with the formulations from embodiment 1. Again, actual measured values compared to spec sheet values show that less materials are used but performance is good.

In a separate and independent aspect, a second set of embodiments of the present invention relate to a multi-layered sheet suitable as floor or wall covering which can optionally exhibit a three-dimensional surface relief and a decorative image, wherein the backing layer and impregnation layer in a support layer of a traditional sheet vinyl are replaced by a single combined co-foamable backing-impregnating layer. In these embodiments a decor layer can be applied to the single gelled co-foamable combined backing-impregnating layer and printing can be applied to the separate decor layer. The combined co-foamable gelled backing-impregnating layer and the decor layer are heated to activate the chemical blowing agent in co-foamable and/or decor layer thereby to form the combined co-foamed backing-impregnating layer and/or the foamed decor layer and to fuse the layers. On the bottom side of such a product no backing layer is required as the combined backing-impregnating layer penetrates sufficiently into the support layer. The chemical blowing of this payer provides a backing layer on the underside of the support layer. An optional backing layer can be applied.

The second set of embodiments can provide a multi-layered sheet suitable as floor or wall covering which can have an upper embossed layer. The embossing can be created by using spatially discontinuous inhibition of chemical foaming of the co-foamed layer and/or of the decor layer. Because the decor layer and/or the gelled co-foamable layer contain a blowing agent and the gelled co-foamable is deep in the construction, a much deeper inhibition can be obtained. Also, the embossing can be created by an embossing roller applied to a wear layer either alone or in combination with inhibited chemical blowing.

The present invention in the second set of embodiments relates to a multi-layered sheet suitable as floor or wall covering which can optionally exhibit a three-dimensional surface relief and a decorative image, comprising:

i. a porous support layer having an upper surface and a lower surface;

ii. a co-foamed layer having an upper surface and a lower surface, the lower surface of the co-foamed layer being provided adjacent to the upper surface of the porous support layer. and the co-foamed layer is impregnated into the porous support layer to form a combined gelled co-foamable backing-impregnating layer. The co-foamed layer combines the functionality of an impregnating layer as well as combining with the support layer to form a backing. The upper surface of the gelled co-foamable combined backing-impregnating layer is covered by a decor layer. The decor layer can optionally comprise a chemical blowing agent and optionally a discontinuous chemically embossed relief pattern, wherein the discontinuous chemically embossed relief pattern can optionally comprise indentations formed by single or stacked dots of a digitally printed material or a rotogravure printed material comprising a foam inhibiting agent;

iii. the upper surface of the decor layer can optionally comprise a printed design as well as the discontinuous chemically embossed relief pattern. Optionally and preferably, at least one wear resistant layer can be provided adjacent to i.e. on the decor layer. The wear resistant layer can be mechanically embossed.

The co-foamable layer can be a gelled froth such as a gelled vinyl froth. This will be co-foamed with a chemically foam a single layer. In the final product the co-foamed layer can be a solidified froth such as a solidified vinyl froth co-foamed with a chemically foamed vinyl in a single layer.

An additional backing layer provided adjacent to and adhered to the lower surface of the support layer is not required but can be provided as an option.

In the above embodiment of the second set, due to the openness of the support layer and the fibers from which it is made, the coating of the co-foamable layer is absorbed or penetrates in the support layer, e.g. the mineral or synthetic fiber layer (of which a glass fiber or polyester support layer are examples) before the coating is gelled. Embodiments of the present invention provide a co-foamable layer on the support layer. The two foaming actions are preferably performed sequentially in time and at different temperatures. The co-foamable layer is mechanically foamed or frothed before application to the support layer, whereby the coating not only penetrates into the top surface of the support layer, but also assumes the function of a backing layer.

A plastisol formulation can be used for the co-foamable layer according to embodiments of the present invention in the second set. The plastisol formulation provides a higher penetration and preferably has a lower filler load of the mechanically foamed co-foamable layer which also functions as a backing layer when compared with a non-mechanically foamed impregnation layer. The reduced filler content allows the plastisol to penetrate better in the interlayer pores (e.g. pores between synthetic fibers in the support layer, such as glass fibers or PET fibers). For example, during pressure application using a push roller, a frothed co-foamable layer according to embodiments of the present invention can penetrate more deeply into the support layer. Without being limited by theory, the reason why the mechanically foamed co-foamable layer penetrates better can be explained by the absorption rate of the plastisol into the support layer before it is cured. Due to the very high weight density, a standard impregnation layer has a different absorption on the support layer compared to a mechanically foamed co-foamable layer which has a lower weight density according to embodiments of the present invention.

With reference to FIG. 1, the mechanically foamed co-foamable layer (8) is applied on the top surface of the support layer (2) by knife coating and, is gelled at a push roller (4)/gel drum (6) and gap (9). However, once it is under pressure on the drum (6) it penetrates easier through the support layer (2) due to the reduced filler amount. This impregnation can be controlled by means of the pressure applied by the push roller (4) on the gel drum (6) and the tension in the support layer to achieve the balance between penetration amount and the function of a backing layer, and also by means of setting the coating weight.

Measured results for this second embodiment made with the second co-foamable formulation are given in FIGS. 7 and 8.

FIG. 7 shows a construction made with the formulations from embodiment 2 with a backing layer. MD and TD refer to machine direction and transverse direction. A backing layer has not been deposited. The actual measured values compared to spec sheet values show that less materials are used but performance is good.

FIG. 8 shows a construction without a backing layer made with the formulations from embodiment 1. Again, actual measured values compared to spec sheet values show that less materials are used but performance is good.

Figure 4:
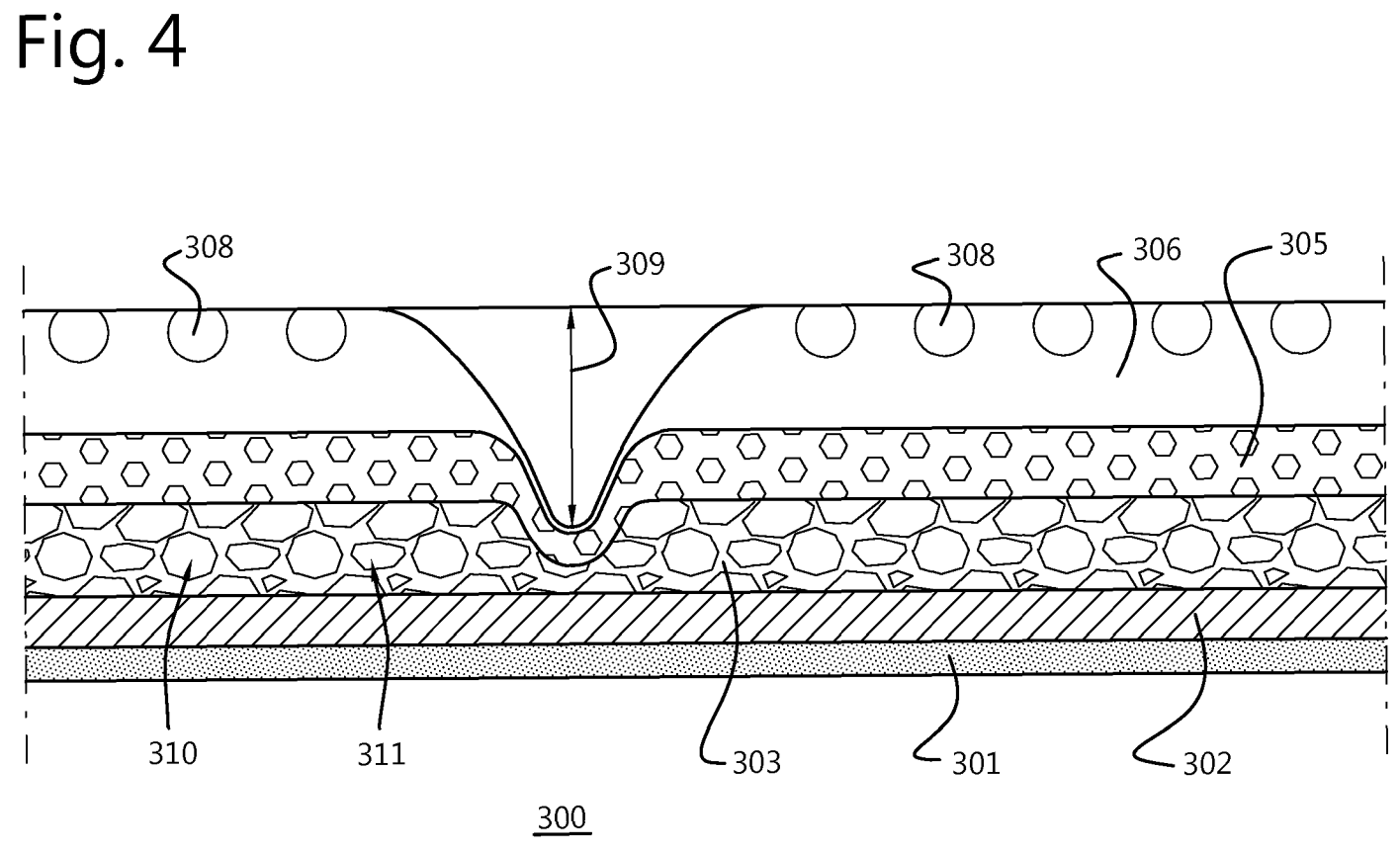

FIG. 4 is provided to indicate how embodiments of the present invention can achieve a deep chemical inhibition.

A co-foamable layer (303) is applied frothed to a support layer (302) and then blown chemically to produce a co-foamed layer of a multilayer sheet product (300) of embodiments 1 or 2 with foam cells (310) produced by frothing and foam cells (311) produced by chemical blowing being within one layer. The frothed co-foamable plastisol is applied to the support layer (302) which can be porous and can include fibers. Also, a backing layer (301) can be applied.

Due to the chemical foaming property of the co-foamable layer, this second foaming contributes to the chemical embossing effect, also known as inhibition, in the sheet vinyl product (300).

When the product passes through the final fusion and chemical foaming step, not only will a decor layer (305) for example foam, but also the co-foamable layer (303). The inhibitors included in the ink printed on the decor layer (305) will inhibit the foaming of both the decor layer (05) and the co-foamed layer 303).

This results in a much deeper chemical embossing depth as shown at (309), which makes the overall product look more natural and realistic compared to, for example, real wood. This also allows a clearer difference between the mechanical embossing indentations (308), which is made by pressing a relief structure in the wear layer (306), and the indentations (309) caused by or enhanced by the chemical inhibition.

For traditional cushion sheet vinyl, the effect is often masked due the mechanical embossing, since the mechanical and chemical embossing practically have the same embossing depth, for example 0.15 mm. Since the deeper chemical embossing in the embodiments of the present invention allows for a depth up to 0.4 mm or up to 0.35 mm, there can be a dual level of embossing depth, one at 0.15 mm for mechanical embossing (308), and one at 0.30 mm for chemical embossing (309). This allows for a more realistic and differentiated embossing pattern.

FIG. 1 illustrates the coating process for use with embodiments of the present invention, wherein the top side of a support layer (2) is coated with a frothed vinyl or PVC plastisol (8) corresponding for example to a formulation of embodiment 1 or 2 disclosed below. The temperature of the frothed vinyl or PVC plastisol (8) is preferably below 50° C. more preferably below 39° C. The support layer (2) can be a porous layer. The support layer can be a non-woven or woven fiber layer or a foil. The coated structure is passed below a coating knife (7) to level the coating. The coated support layer (3) is conveyed over a suitable distance in which the coating impregnates the support layer (2) before the coated support layer (3) is fed onto a heated gelling drum (6) via a push roller (4) with the coated side touching the heated drum surface. The push roller (4) pushes the coated support layer (3) against the drum (6) with a pressure that it not sufficient to collapse the frothed foam but the pressure can be sufficient to contribute to the impregnation of a porous support layer. The coated support layer (3) is then heated by contact with the hot drum (6) to a gelling temperature between 60° C. and 150° C. for example between 110° C. and 165° C. resulting in gelling of the coating. The gelling time can be set by size of the drum the speed of rotation of the drum and the position of an extraction roller (1) which guides the gelled coated support layer (5) away from the drum (6). The gelling time and temperature should be set so that the chemical blowing agent in the plastisol is not activated. This may require a temperature below 150° C. such as down to 140° C.

The gelled support layer (5) can subsequently be printed with inks (e.g. after cooling), in order to provide a printed decorative layer comprising a decorated pattern according to the first set of embodiments. The pattern can include a discontinuous distribution of printed foaming inhibitor. Alternatively, according to the second set of embodiments a decor layer can be applied onto the gelled support layer (5), and the decor layer can be printed.

The printed support layer with the decorative pattern can be coated with a wear layer composition e.g. vinyl or PVC or polyurethane based, e.g. with layer weight of 200 to 700 g/sqm. The coated structure can then then be heated in an oven at a temperature between 170° C. and 220° C., such as between 170° C. and 200° C., to activate the chemical blowing agent in the co-foamable layer and/or the decor layer, if present, and/or in the wear layer, if present, and to fuse the co-foamed layer. The wear layer is formed on top of the printed decorative layer and can have a thickness between 0.1 and 0.7 mm. The printing can include spatially discontinuous printing of a foaming inhibitor which prevents or reduces the foaming by chemical blowing of the printed gelled co-foamable coating on the support layer and/or the decor layer if present. The inhibitor can be applied in different places resulting in a surface structure.

Alternatively or additionally, an embossing roller can be used to emboss the surface of the wear layer while this is still soft to form a surface structure.

An advantage of the above described method is that it is unnecessary to cool the coated layers followed by reheating these layers to allow a mechanical embossing.

Subsequently, a UV lacquer, e.g. made of a polymer based on an acrylate, an epoxy resin or a polyurethane can be applied to the wear layer and subsequently cured by using a UV light source e.g. having a wavelength of 260 nm and a curing temperature of, for example, 45° C. The surface coating thereby formed can have a thickness of 0.05 mm. Optionally, the bottom side of the coated support layer, opposite to the decorative layer, can be coated with a plastisol such as a vinyl or PVC plastisol to form a backing layer. This coating can be heated to 60 to 150° C. to gel it and to 180° C. to 220° C. to fuse it. The coating can be foamed with a chemical blowing agent. The coating formed at the bottom side of the textile layer can have has a thickness of 0.1 to 3 mm. The gelling time and temperature should be set so that the chemical blowing agent in the plastisol is not activated. This may require a temperature below 150° C., such as down to 140° C.

Figures 2, 3:
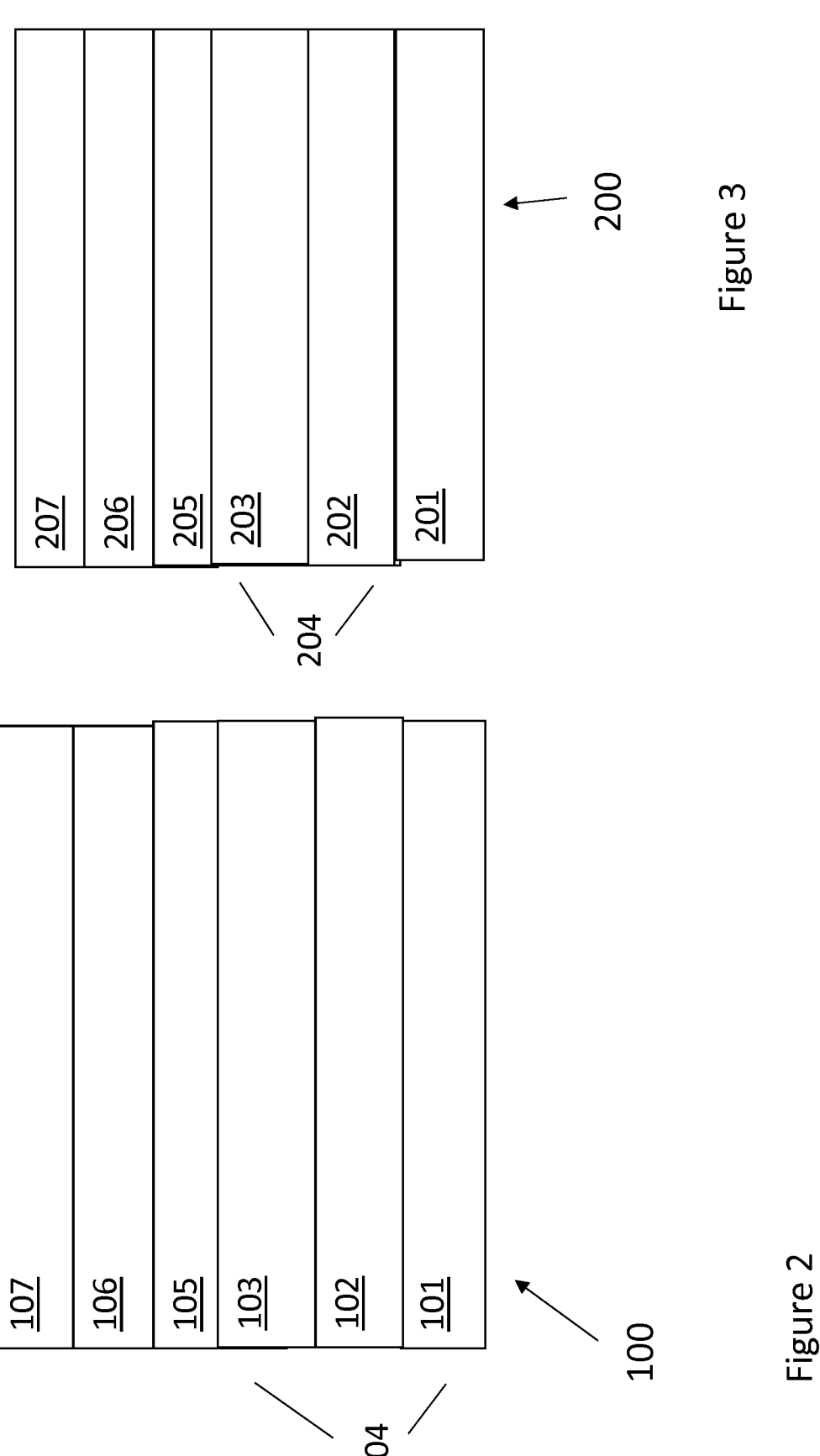
FIGS. 2 and 3 show two different floor tiling constructions of two embodiments of the present invention.

FIG. 2 shows a cross-sectional view of a multi-layered vinyl sheet (100) according to an embodiment of the present invention belonging to the first set of embodiments comprising from bottom to top, a backing layer (101), a support layer (102) e.g. optionally comprising fibers and a co-foamed layer (103) forming together a combined impregnating-decor layer 104, an optional decorative (decor) layer (105), a wear resistant layer (106) and an optional top coat or lacquer (107). The combined gelled co-foamable impregnating-decor layer (104) can be printed and the printing can include optionally a discontinuously applied foaming inhibitor. After activation of the chemical blowing agent of the combined gelled co-foamable impregnating-decor layer (104), the sheet (100) has an embossed upper surface and the co-foamed layer (103) is fused. Optionally the wear layer (106) can be mechanically embossed.

FIG. 3 shows an exploded view of a multi-layered vinyl sheet (200) according to an embodiment of the present invention belonging to the second set of embodiments comprising from bottom to top, an optional backing layer (201), a porous support layer (202) optionally comprising fibers, a co-foamed layer (203) forming with the porous support layer a combined impregnating-backing layer (204), a decor layer (205) having printing applied to the top surface of the decor layer (205), the printing including an optionally discontinuously applied foaming inhibitor, a wear resistant layer (206) and an optional top coat or lacquer (207). In manufacture after activation of the chemical blowing agent of the co-foamable layer (203), the sheet (200) has an embossed upper surface. Optionally the wear layer (106) can be mechanically embossed.

A vinyl sheet (100, 200) in accordance with embodiments of the present invention can include a support layer (102, 202) having an upper and a lower surface and comprises preferably a non-woven or woven layer. In the finished product the support layer (102, 202) can be impregnated with the co-foamable layer (103, 203) to form a fused co-foamed layer which is combined with the support layer (102, 202).

The support layer (102) or (202) and optionally backing (201) can be a woven or non-woven layer, preferably a glass fiber cloth or glass fiber fleece or similar materials made from mineral fibers such as glass or synthetic fibers, such as polyester fibers. The support layer (102, 202) with fibers can be impregnated at least partially with a co-foamable layer (103, 203). The impregnation can be such that there is no need for a backing layer as the co-foamable material impregnates the support layer (102) completely and a thin backing layer is formed especially by the chemical blowing step.

The composition of the co-foamable layer (103, 203) in any of the embodiments can be a combination of two or more different vinyl materials or PVC's such as a blend of two or more vinyl materials or PVC's. The polyvinyl chloride (PVC), is preferably plasticized PVC.

The co-foamable composition can include two different thermoplastic polymers that include vinyl containing thermoplastics such as polyvinyl chloride, polyvinyl acetate, polyvinyl alcohol, polyvinyl butyral and other vinyl and vinylidene resins and copolymers thereof;

The co-foamable layer (103, 203) can be provided as a frothed plastisol and is applied to the upper surface of the support layer (102, 202) at a temperature below 50° C., e.g. below 39° C. The co-foamable layer (103, 203) preferably comprises a foamable synthetic material, which can be mechanically foamed or frothed and is also capable of expanding upon thermal treatment e.g. by activation of a chemical blowing agent.

Embodiments of the present invention make use of a chemical blowing agent heated to make a co-foamed layer in which a gelled frothed layer is the same layer as the chemically blown material resulting in the co-foaming being in the same coated layer. Embodiments of the present invention integrate this co-foamed layer to make 3-layer vinyl sheet flooring products such as cushion vinyl products.

The co-foamed layer (103, 203) in any of the embodiments preferably includes more than one type of vinyl material or PVC, e.g. a first type of vinyl material or PVC that works (i.e. is adapted) for mechanical foaming, and at least one type of vinyl material or PVC that works (i.e. is adapted) for making a chemical foam in the same layer where the mechanical foam was created. PVC homopolymer powder produced by emulsion and/or micro-suspension technology can be described by: K-value (length of the molecular chain) and surfactants used in a plastisol composition. For mechanical foam the K-value is preferably 80. For a chemical foam the K-value is preferably 60-70, and the types of PVC should be selected so that can be used to be foamed mechanically in blends or pure (F34).

Values of PVC that are known to work in a mechanical foam are as follows:

Formosa F34 which works in blend with K80, having K-value of 68

Vestolit P1415K80: having a K-value of 80

Vestolit B7021 which works in blend with K80, with K-value 70.

Preferably, the K-value of the PVC for mechanical foaming is higher than 68. Application of the mechanically foamed (frothed) plastisol to the support layer is preferably performed at a temperature while the plastisol is still liquid. To do that, the temperature of the plastisol needs to be lower than 50° C. preferably below 39° C., else the plastisol would start to gel, and would not allow it to be coated by knife over roll.

K-values of the PVC component in the formulation of the co-foamable material for chemical foaming are preferably in the range 60-70. Above 70 the molecular chain length can be too long to effectively form a foam. Lower than 60 often makes the foam less strong, which can lead to pre-mature collapse during the foaming/final gelling process.

For chemical foaming, azodicarbonamide can be used but different blowing agents which foam at different temperatures than azodicarbonamide can be used. Preferably, the chemical blowing agent does not give off $H_2O$ at the same time as it releases the gas for blowing.

The plastisol for coating of a co-foamable material preferably has the following characteristics:

Viscosity: 4000-5000 cP at temp around 27° C. Higher viscosity results in less penetration of the support layer, e.g. 10.000 cP. Such a viscosity can be used where a backing layer is applied.

Chalk %: high percentage of chalk inhibits the permeation through the fiber glass ("clogs the filter"). The mechanical foam preferably has 35%, up to 50 wt % of a mineral filler such as chalk.

Push roll pressure: pressure of rubber roller pressing against the coating as it contacts the metal gelling drum: more pressure is more penetration as it is pushed through.

Process settings:

foam density of mechanical foam should be around 700-1000 gram/liter push roller: rubber type, curvature and pressure: pressure is important at +−7 bar, or between 6-10 bar.

Gelling oven: the composition for co-foaming composition according to embodiments of the present invention can be more sensitive to overfoaming due to presence of air bubbles in the mixture, which form local hotspots in the coating. This can cause the vinyl material or PVC to foam chemically more efficiently (requiring less heat) compared to a regular decor layer with only a chemical foaming agent, The chemical blowing phase may advantageously be achieved by incorporating one or more blowing agent(s) into the co-foamable layer formulation, and by increasing the temperature thus allowing the mechanically foamed layer to expand by chemical blowing. The use of blowing agents as well as inhibitors to create flexible vinyl or PVC foams with support is well known, see for instance Ullmann's Polymers and Plastics, 4 Volume Set: Products and Processes, p. 1578, Wiley-VCH Verlag, Weinheim, 2016. Generally, blowing agents used herein are solids that are dispersed throughout the polymer and generate gas by chemical decomposition, resulting in the formation of gas-filled cells throughout the polymer. The cells result in the formation of a sponge or foam structure that has a lower bulk density than the solid polymer. Blowing agents that generate gas after their incorporation into the polymer are termed "in situ" blowing agents, and function by chemical decomposition of the blowing agent under the conditions of a so-called blowing step. An advantage of in situ blowing agents is that they are triggered selectively, whereby a foam is formed. Chemical blowing agents are typically solids which decompose at elevated temperatures, wherein a gas is formed, thereby driving the expansion of the mechanically foamed and gelled layer to a co-foamed layer. Inorganic blowing agents may be employed, such as ammonium hydrogen carbonate, or organic blowing agents such as p-toluenesulfonhydrazide, 4,4'-oxybis(benzenesulfonhydrazide), N,N'-dinitrosopentamethylenetetramine, or azodicarbonamide. Preferably the blowing agents do not generate water when blowing the foam. A limited amount of water can be added or can be generated internally in addition to any chemically blowing agent such as inorganic or organic blowing agents. Water in limited quantities can help in the process of chemical foaming due to steam formation at the temperature at which chemical foaming happens.

The amount of water which can be added or generated in the plastisol is 0.1-1.5%, preferably 0.3-1.0, ideally about 0.5% wt % of total plastisol composition. Adding a very limited amount of water can improve the impregnation and saturation of the porous layer and creation of the backing layer.

Organic blowing agents provide a number of advantages over inorganic blowing agents, such as ammonium hydrogen carbonate, as they allow easier dispersion in the polymer formulation, provide higher gas yields, decompose within a narrower temperature range and are sufficiently stable upon storage. Also, their decomposition temperature can be lowered below the working temperature by activation through the use of active kickers. Through deactivation of the kicker by inhibiting agents, the decomposition temperature of the blowing agent-kicker mixture increases to a value above the working temperature. Preferably, the co-foamable compositions employed herein comprise a nitrogen containing chemical blowing agent. The blowing agents which have found the most wide-spread use are those compounds having N—N bonds which decompose at elevated temperature to yield an inert gas high in nitrogen, also referred to as "nitrogen containing blowing agents" without generating water in the foaming process. A limited amount of water can be added or can be generated internally in addition to any chemically blowing agent such as nitrogen containing blowing agents. Water in limited quantities can help in the process of chemical foaming due to steam formation at the temperature at which chemical foaming happens.

The amount of water which can be added or generated in the plastisol is 0.1-1.5%, preferably 0.3-1.0, ideally about 0.5% wt % of total plastisol composition. Adding a very limited amount of water can improve the impregnation and saturation of the porous layer and creation of the backing layer.

Nitrogen has a low permeability in polymers, which is highly desirable to prepare for instance closed cell foam layers. A particularly useful nitrogen containing blowing agent for polymers is azodicarbonamide. Thermal decomposition of azodicarbonamide results in the evolution of nitrogen, carbon monoxide, carbon dioxide, and ammonia gases, which are trapped in the polymer as bubbles to form a foamed article. While azodicarbonamide can be used neat, it preferably is modified to affect the decomposition temperature range. Generally, blowing agent decomposition is a function of chemical activation, particle size and temperature. Accordingly, it is common practice to add kickers into the compositions to reduce the decomposition temperature and/or to narrow the decomposition temperature range. The blowing agent should start to decompose at a temperature higher than used to gel the same layer when it has been mechanically foamed. For example, azodicarbonamide generally starts to decompose at 200° C., although with addition of a kicker, such as zinc oxide, it is possible to reduce the decomposition temperature to the range of from 160° C. to 195° C. However, when gelling the plastisol layer before printing the chemical blowing agent should not be activated. Activation of the blowing agent is done after the application of the print and blow inhibitor if present. Useful blowing agent kickers include, but are not limited to citric acid, oxalic acid, p-toluene sulfonic acid, phosphoric acid, potassium carbonate, borax, triethanol amine, zinc chloride, zinc acetate, zinc oxide, zinc stearate, barium stearate, calcium stearate, urea and polyethylene glycol. Preferably, the at least one blowing kicker comprises zinc oxide, or zinc oxide and urea. The nitrogen containing blowing agent and at least one blowing agent kicker are preferably compounded together prior to being added to the polymer material. Kicked azodicarbonamide is preferred to produce the co-foamed layer with optional chemically embossing. Azodicarbonamide, combined with a kicker, is a preferred blowing agent in the formation of foamable material, in particular in materials comprising polyvinyl chloride (PVC), specifically plasticized PVC, as it can be incorporated easily into the polymer material. Upon decomposition, it then forms gas bubbles.

Plasticized, i.e. soft vinyl material or PVC foam is particularly useful as flooring or wall covering material due to its resilience, and high friction coefficient on smooth surfaces. The preferred kickers for this invention are zinc oxide and/or urea. The quantity of the kicker is generally from about 10% to 70% by weight of the azodicarbonamide, preferably from 20% to 50% and most preferably from about 35% to 45%. Since the particle size is also relevant for the speed and release of gas, as well as the size of the foam cells thus formed, the nitrogen containing blowing agent and at least one blowing agent kicker preferably have an average particle size of less than 5 μm, more preferably less than 4 μm as measured by a laser particle size measuring device. The blowing agent is preferably uniformly dispersed in the co-foamable layer.

While the support layer (102, 202) primarily provides mechanical strength and dimensional stability, the co-foamed layer primarily provides flexibility and acoustic characteristics. These characteristics are important to a variety of covering panel products such as floor or wall covering materials. Hence, the co-foamed layer preferably is a "resilient" layer referring to the ability of a material of at least partially regaining its original shape or position after bending, stretching, compression, or other deformation. The co-foamed layer preferably has a surface weight from 100 gsm to 600 gsm, more preferably from 200 gsm to 400 gsm and most preferably from 250 gsm to 300 gsm. Preferably, the non-inhibited foamed layer has a thickness from 0.17 mm to 1.10 mm.

First Embodiment

Referring to FIG. 2, a first embodiment of the present invention is a sheet vinyl with a co-foamable layer to replace conventional impregnating and decor layers (previously applied as $1^{st}$ & $2^{nd}$ coatings). Since the co-foamable layer can be frothed and gelled and also contains chemical foaming agent (e.g. AZO), it allows to have, using only one layer, a double function of:

Impregnation layer (conventional $1^{st}$ coating)

Decor layer (conventional $2^{nd}$ coating). The printing is applied to the gelled co-foamable layer and the printing can include a spatially discontinuous chemical foam inhibitor.

In this embodiment, there is only 1 coating layer functioning as a combined impregnating-decor layer rather than traditionally 2 layers before printing on the upper layer. There is therefore one less coating machine required and also One less FTE required One less process step and less risk for defects Material saving of (for example)

80 $g/m^2$ coating plastisol of $1^{st}$ layer 250-330 $g/m^2$ coating plastisol of $2^{nd}$ layer Although the co-foamed layer is more expensive in price/kg, due to above weight savings there is a net cos saving.

| Traditional cushion vinyl layers | FIRST Embodiment for cushion vinyl layer |
| --- | --- |
| Lacquer (optional) | Lacquer (optional) |
| Top Emboss (optional) | Top Emboss (optional) |
| Wear Layer ($3^{rd}$ coating) | Wear Layer ($3^{rd}$ coating) |
| Decor Layer ($2^{nd}$ coating of 250-350 gsm) | Co-foamed impregnating-decor Layer ($1^{st}$ + $2^{nd}$ coating combined in one single |
| Impregnation Layer ($1^{st}$ coating 200-400 gsm) | coating, e.g. of 250-350 gsm) |
| Interlayer/support layer (glass or PET) | Interlayer/support layer with synthetic fibers such as glass or PET fibers, woven or non-woven, mesh, net |
| Backing Layer ($4^{th}$ coating) | Backing Layer ($4^{th}$ coating), optionally backing |

The components of the co-foamable composition can be as follows (table 1):

TABLE 1

| Ingredient | Company | PHR | m/m % |
| --- | --- | --- | --- |
| Formolon 260 | Formosa Plastics | 30 | 10.60 |
| Formolon 34 | Formosa Plastics | 50 | 17.67 |
| P1415 K80 | Vestolit | 20 | 7.07 |
| Benzoflex 2088 | Velsico | 32 | 11.31 |
| DOTP | LG | 34 | 12.01 |
| Hubercarb G 260 | Huber carbonates | 100 | 35.33 |
| Ti 22 dispersed | BIG in-house formulation | 10.92 | 3.86 |
| BL 45 (includes chemical blowing agent Azo) | BIG in-house formulation | 4.59 | 1.61 |
| BYK807 | BYK Chemicals owned by Altana. | 1.5 | 0.53 |

After the above formulation has been applied as a co-foamable layer, this layer is gelled and printed or a decorative layer is applied. A wear layer is coated on whatever form of decoration that is applied. The wear layer may have a formulation as follows (table 2):

TABLE 2

| Ingredient | Company | PHR | m/m % |
| --- | --- | --- | --- |
| 382NG | Solvin | 25 | 17.71 |
| Ecolvin T75-M-25 | Mexichem | 60 | 42.49 |
| Formolon-260 | Formosa Plastics | 15 | 10.62 |
| Benzoflex 2088 US | Eastman | 11 | 7.79 |
| DOTP | LG | 18 | 12.75 |
| Jayfelx MB10 | Exxon | 7 | 4.96 |
| Atepas OT45 | Avivan | 1.26 | 0.89 |
| Plastistab 2040 | AM stabilizer | 3.94 | 2.79 |

A back foam may be applied on the lower surface of the porous support layer with a formulation such as (table 3):

TABLE 3

| Ingredient | Company | PHR | m/m % |
| --- | --- | --- | --- |
| B7021 | Vestolit | 10 | 3.10 |
| Formolon-260 | Formosa Plastics | 10 | 3.10 |
| Formolon-34 | Formosa Plastics | 80 | 24.82 |
| DOTP | LG | 40 | 12.41 |
| Jayflex MB10 | Exxon | 21 | 6.52 |
| Hubercarb G260 | Huber Carbonates | 150 | 46.54 |
| BL28 | BIG | 6.7 | 2.08 |
| Avi Visco 210 | Avivan | 3 | 0.93 |
| Lankromark LZK 101 | Ackros | 1.6 | 0.50 |

Second Embodiment

With reference to FIG. 3, this embodiment of the second set comprises a vinyl sheet having a single co-foamable coating to replace separate backing and impregnating coatings (conventional $1^{st}$ & $2^{nd}$ coating), with addition of a separate decor layer conventional ($2^{nd}$ coating), with a $3^{rd}$ coating (wear layer) and no separate backing layer (conventional 4th coating). In this case the co-foamable layer can have a slightly different formulation as it is covered with a separate decor layer (conventional $2^{nd}$ coating) before the decor layer is printed on. A difference in the formulation more specifically is the presence of $TiO_2$ (white) premix dispersion, which is not needed in this embodiment since there is no print on this layer. $TiO_2$ is to make the layer more white to allow for a whiter substrate before it is printed on. The presence of a $TiO_2$ premix directly affects the minimum foam density that can be achieved. While for both possibilities 800-1000 g/l is desirable, when it contains $TiO_2$ it is sometimes not possible to achieve 900 g/l or lower. Also, it also affects the chemical blow ratio so that $TiO_2$ lowers the chemical foam ratio in the co-foamed layer. Not having it in the formulation restricts both chemical and mechanical foam ratio less.

This option has the disadvantage that product is unbalanced in terms of weight on top/bottom of the support layer, which can allow curling. In this case the soft wear layer formulation is applied to avoid strong curling.

| Traditional cushion vinyl layers | New proposed cushion vinyl layers |
|---|---|
| Lacquer (optional) | Lacquer (optional) |
| Top Emboss (optional) | Top Emboss (optional) |
| Wear Layer (3$^{rd}$ coating) | Wear Layer (3$^{rd}$ coating) |
| Decor Layer (2$^{nd}$ coating of 250-350 gsm) | Additional standard Decor layer (300-500 gsm) to create thickness of product due to no backfoam |
| Impregnation Layer (1$^{st}$ coating 200-400 gsm) | Co-foamed impregnating and backing Layer |
| Interlayer/support layer (glass or PET) | Interlayer/support layer (glass or PET) |
| Backing Layer (4$^{th}$ coating) | limited back coating appearance due to penetration of co-foamable layer through support layer, no backing or optional backing. |

The components of the co-foamable composition can be as follows (table 4):

TABLE 4

| Ingredient | Company | PHR | m/m % |
|---|---|---|---|
| Formolon-260 | Formosa Plastics | 30 | 11.03 |
| Formolon-34 | Formosa Plastics | 50 | 18.38 |
| P1415K80 | Vestolit | 20 | 7.35 |
| Benzoflex 4188 | Velsicol | 32 | 11.76 |
| DOTP | LG | 34 | 12.50 |
| Hubercarb G 260 | Huber carbonates | 100 | 36.75 |
| BL 45 (includes chemical blowing agent Azo) | Beaulieu International Group in-house formulation | 4.59 | 1.69 |
| BYK8070 | BYK Chemicals owned by Altana. | 1.5 | 0.55 |

After the co-foamable layer has been applied, e.g. by knife coating and gelled, a decor layer can be applied such as follows (table 5):

TABLE 5

| Ingredient | Company | PHR | m/m % |
|---|---|---|---|
| B7021 | Vestolit | 20 | 7.67 |
| Formolon-260 | Formosa Plastics | 30 | 11.50 |
| Formolon-34 | Formosa Plastics | 50 | 19.16 |
| Benzoflex 2088 US | Eastman | 10 | 3.83 |
| DOTP | LG | 38 | 14.56 |
| Jayfelx MB10 | Exxon | 10 | 3.83 |
| Hubercarb G260 | Hubercarb Carbonates | 85 | 32.58 |
| Ti22 dispersie | BIG | 10.92 | 4.19 |
| BL28 | BIG | 4.59 | 1.76 |
| Atepas OT45 | Avivan | 0.4 | 0.15 |
| Avi Visco 210 | Avivan | 2 | 0.77 |

After this layer has been printed or a decorative layer applied, a wear layer may be applied with a formulation such as (table 6):

TABLE 6

| Ingredient | Company | PHR | m/m % |
|---|---|---|---|
| 382NG | Solvin | 25 | 17.71 |
| Ecolvin T75-M-25 | Mexichem | 60 | 42.49 |
| Formolon-260 | Formosa Plastics | 15 | 10.62 |
| Benzoflex 2088 US | Eastman | 11 | 7.79 |

TABLE 6-continued

| Ingredient | Company | PHR | m/m % |
|---|---|---|---|
| DOTP | LG | 18 | 12.75 |
| Jayfelx MB10 | Exxon | 7 | 4.96 |
| Atepas OT45 | Avivan | 1.26 | 0.89 |
| Plastistab 2040 | AM stabilizer | 3.94 | 2.79 |

An alternative in the second embodiment would be to coat a very small back coating layer. This allows for a very low back coating of 100-150 g/m$^2$.

Formulations—Explanations

Formolon-260: Fine particle size plastisol blending resin PVC homopolymer (e.g. K=63)

Formolon-34: medium molecular weight dispersion PVC homopolymer (e.g. K=67)

Vestolit=PVC from Vestolit GmbH & Co. KG

Vestolit P1415 K80 Ultra PVC

VESTOLIT offers a range of Emulsion (E)-PVC grades for paste processing as well as thermoplastic processing, which are produced in the continuous as well as in the discontinuous polymerisation process.

BYK 8070=Soap-based foam stabilizer for mechanically foamable PVC plastisols (BYK Chemicals owned by Altana).

Benzoflex 2088 is a plasticizer from Eastman Chemical Company

Hubercarb® G260 from Huber Carbonates is a 22-micron calcium carbonate produced in Marble Hill, GA for paints, coatings, adhesives, caulks and sealants applications.

LG Chemical DOTP=dioctyl terephthalate (also available from BASF or Eastman).

First and Second Embodiments—Co-Foamable Layer

PVC Extender (Formosa F260 or Mexichem G FIT-51), also known as PVC filler used for cost reduction. PVC filler amounts:
Suitable range 0-25%
A preferred range is: 5-15%
A more preferred range is: 8-12%

PVC F34: emulsion PVC from Formosa which has both the property of working in a chemical foam and in a blend suitable for making a mechanical foam. This PVC contributes to the co-foamable material to foam chemically. Preferably the amount used provides mechanical foam stability resulting from the combination of the lower K-value of 67, versus 80 for P1415K80. Emulsion PVC which has both the property of working in a chemical foam and in a blend suitable for making a mechanical foam can be used in the amounts:
Suitable range: 5-40%
Preferred range: 10-30%
More preferred range: 15-20%

PVC P1415K80: emulsion PVC from Mexichem-Vestolit. Resin used for production of mechanical foam. Mechanical foaming formulation uses blend of this PVC having K value=80 with extender such as F260. Blending this with F34 provides a co-foamable material. The blend provides balance to have both mechanical foam density which is a stable foam (does not collapse) and allows chemical foaming, while maintaining a processable viscosity. Resin used for production of mechanical foam can be used in the amounts:

Suitable range: 0-40%

Preferred range: 4-20%

More preferred range: 3-10%

Benzoflex 2088 (Eastman): dibenzoate plasticizer, provides fast fusing and gelling properties. This fast fusing property allows economical line speeds. It can be used in any layer layers for its fast properties. It is a plasticizer which is suitable for making a mechanical foam. A plasticizer providing fast fusing and gelling properties can be applied in the following ranges:

Suitable range: 0-30%

Preferred range: 5-20%

More preferred range: 8-14%

DOTP (LG/Eastman/BASF/ . . . ): terephthalate plasticizer not of the fast fusing type like mentioned above. Suitable for making a mechanical foam. Alternative plasticizers which work are DOP, DINP, . . . . A plasticizer not of the fast fusing type and suitable for making a mechanical foam can be used in the amounts:

Suitable range: 5-30%

Preferred range: 6-20%

More preferred range: 10-14%

Calcium carbonate G260 (Huber): ground marble stone with median particle size of 22 micron. This is used to make the formulation cheaper, by using less PVC resin. Too high quantities can sometimes affect first of all, the mechanical foaming (e.g. when present >35%), and also the chemical foaming at even higher levels (e.g. when present >45%). Inorganic mineral filler can be used in the following amounts:

Suitable range: 0-60%

Preferred range: 20-45%

More preferred range: 30-40%

Ti22 dispersion (only in first embodiments): in-house self-made mix containing $TiO_2$ powder: makes the gelled co-foamable layer more white to print on.

Dispersing agent Disperplast 1148: keeps $TiO_2$ powder in dispersion of premix for accurate dosing DOTP: liquid to make the dispersion Ti22

Titanium dioxide can be used in the following amounts:

Suitable range: 0.1-6%

Preferred range: 3-4.5%

More preferred range: 3.5-4.1%

BL45 dispersion: a pre-mix containing:

Blowing agent yellow azodicarbonamide fine powder: for co-foamable layer for provision of chemical foaming in a later phase of the process after gelling on the gelling drum Dispersing agent Disperplast 1148: keeps azo powder in dispersion of premix for accurate dosing DOTP: liquid to make the dispersion

BL45

Such a premix can be used in the following amounts:

Suitable range for mix: 0.1-6%

Preferred range of mix: 0.5-4%

More preferred range of mix: 1.2-2.0%

BYK 8070: mechanical foaming agent, surfactant, which is a type of soap (Chemicals owned by Altana). A mechanical foaming agent, such as a surfactant which is a type of soap can be used in the following amounts:

Suitable for mechanical foaming while allowing chemical foaming, e.g. tolerates mechanical foamability, also the chemical foam ratio and the coating process (e.g. not sticking to gelling drum)

Suitable range: 0-3% or 0.1-3%

Preferred range: 0.2-2% or 0.2 to 1.5%

More preferred range: 0.4-1% or 0.3 to 0.6%

Mechanical Foam Density of Co-Foamable Layer as Applied:

First Embodiment

Suitable range: 300-1500 g/liter

Preferred range: 500-1000 g/l

More preferred range: 600-800 g/l

Can be reduced to keep co-foamable paste more on top of support layer to be printable without print defects like white spots Second Embodiment Suitable range: 300-1500 g/liter Preferred range: 600-1100 g/l More preferred range: 750-1000 g/l→target 880 g/l Coating Amount of Co-Foamable Layer as Applied First Embodiment Suitable range: 100-800 $g/m^2$ Preferred range: 350-550 $g/m^2$ More preferred range: 350-470 $g/m^2$→target 420 $g/m^2$ This can be higher to be able to print without white spots.

Second Embodiment

Suitable range: 100-800 $g/m^2$

Preferred range: 250-500 $g/m^2$

More preferred range: 300-400 $g/m^2$→target 370 $g/m^2$

Embossing that can be Achieved with Embodiments

Embossing depth can be up to 0.4 mm, for example between 0.25 and 0.4 mm, with a line width from 1 to 4 mm (see FIG. 4). The co-foamed layer especially with an additional decor layer, gives a benefit of deep chemical emboss through inhibition.

Support Layers for the Embodiments

For a porous support layer e.g. having fibers an air permeability in the range 1000-5000 $l/m^2$*s according to ISO 9237 at 100 Pa, has been found suitable. A preferred porosity or openness of the layer is preferred, as it can give good impregnation and saturation by the co-foamable or hybrid layer. The air permeability and thickness of the porous layer are more preferably:

Air permeability at 100 Pascal, measured according to ISO 9237: at least 1700 $l/m^2$·s, e.g. 1700 to 2500 $l/m^2$·s and a preferred range is 2200-2500 $l/m^2$·s.

Below 1700 is not excluded from the present invention, but it is less preferred as there would be a need to coat too much more hybrid foam or co-foamable material.

Thickness: less than 0.35 mm, preferred around 0.28-0.30 mm. If thinner than 0.24 mm, the porous layer is not strong enough and could break.

In some embodiments of the present invention belonging to the first set, the upper surface of the gelled co-foamable layer is digitally printed with a material ("digitally printed material") which optionally can contain an agent which inhibits foaming ("foam inhibiting agent"). The digitally printed material comprising the foam inhibiting agent is preferably printed by digital printing such as inkjet printing but other methods are included within the scope of this invention such as spray printing or tampon printing or rotogravure.

"Digital printing" herein refers to a method of printing from a digital-based image or pattern directly to a substrate. Examples of digital printing techniques include inkjet printing and laser printing.

"Inkjet printing" is a digital printing technique known in the art that recreates a digital image or pattern by propelling droplets of a material, typically a colorant, for example an ink, onto a substrate. Typically, print heads using e.g. piezoelectric crystals are used to eject the droplets out of the nozzle orifice on to the substrate. Generally, there are two main technologies in use in contemporary inkjet printing processes: continuous (CIJ) and drop-on-demand (DOD)

The digital printing results in single or stacked dots of a material comprising foam inhibiting agent being deposited on the surface of a foamable material, with interstitial unprinted areas.

The foaming inhibiting agent then penetrates downwards into the co-foamable layer and will counteract the development/expansion of the foam during thermal treatment by chemical blowing. Areas of the gelled co-foamable layer which have not been printed with the foam inhibiting agent or where no foam inhibiting agent has penetrated, are thus expanding normally upon thermal treatment to activate the chemical blowing agent, while expansion of the gelled co-foamable material is suppressed or reduced in areas printed with the foam inhibiting agent, resulting in a surface with discontinuous chemically embossed relief pattern with indentations.

Consecutive passes of printing will layer or stack dots on top of each other. Stacking of the dots has the advantage that locally, higher amounts of inhibitor can be printed, resulting in deeper indentations after foam expansion. Also, a depth differentiation can be created by varying the number of dots stacked. Hence, embossing patterns with a very high resolution can be created.

The effectiveness of inhibition depends on the permeability, solubility and diffusion speed and distance of the foam inhibiting agent into the gelled co-foamable layer. A wide range of compounds may be employed to act as inhibitors for chemical embossing of foamable layers in floor and wall covering surfaces. The choice of an inhibiting agent for the blowing agent and kicker will depend on the particular blowing agent utilized in the gelled co-foamable layer. Triazole compounds such as benzotriazole (BTA), tolyltriazole (TTA) and derivatives and/or combinations thereof can conveniently be used as a foam inhibiting agent for the chemical embossing of the gelled co-foamable material comprising azodicarbonamide as blowing agent, and ZnO as kicker. Alternative chemical inhibitor used in inks is thioureum.

A preferred foam inhibiting agent is 1H-Benzotriazole-1-methanamine, N,N-bis(2-ethylhexyl)-ar-methyl (CAS 94270-86-7).

The foam inhibiting agent is preferably present in a, preferably liquid, carrier which allows better control of the amount of inhibitor to be applied. Preferably, the foam inhibiting agent is present in the carrier at a concentration of from 1 to 20 wt. %, of total weight of the carrier, based on solid matter, more preferably in an amount of from 7 to 15 wt %, and again more preferably of from 9 to 12 wt %.

While the material comprising the foaming inhibitor may be a physically drying or thermoplastic material, it preferably may comprise a binder material that allows at least a partial cure after printing the dots, to avoid that the dots spread out and to permit deposition of additional (stacked) dots directly thereafter, while at the same time reducing possible defects. More preferably, the binder material is radiation-curable, preferably UV-curable. Accordingly, the present invention also relates to a sheet or substrate, wherein the digitally printed material comprises a radiation-curable binder material and the foam inhibiting agent.

In order to obtain high flexibility and good adhesion, the binder material preferably comprises an acrylate. Preferably, the acrylate comprises isobornyl acrylate (CAS 5888-33-5), dipropylene glycol diacrylate (CAS 57472-68-1), or combinations thereof. More preferably, the digitally printed material comprises of from 10 to 30 wt. % of isobornyl acrylate, and of from 5 to 20 wt. % dipropylene glycol diacrylate.

The curable binder material is at least partially cured, e.g. using UV light preferably within 5 seconds after contact with the gelled co-foamable layer, which will prevent defects or flow outs, while still permitting penetration of the inhibitor agent into the gelled co-foamable layer.

The digitally printed material may further comprise a UV-initiator, preferably in an amount of from 1 to 10 wt. %, based on total weight of the digitally printed material. A highly preferred UV-initiator is Trimethylbenzoyldiphenyl Phosphine Oxide (TPO), known under CAS 75980-60-8.

In any case, whether the foam inhibiting material is cured or physically dried, it has been found that the foam inhibiting material penetrates into the gelled co-foamable layer after printing, as evidenced by the indentations formed upon foam expansion by chemical blowing at locations where dots of digitally printed inhibitor material or a rotogravure printed material had been deposited. Further, a particular advantage of the subject invention resides in the fact that several dots of inhibitor material can be printed on the same location, resulting, for instance, in a higher local amount of inhibitor in the gelled co-foamable layer, and, hence, a stronger reduction of foam formation. By stacking the printed inhibitor, higher height differences in the relief can be achieved at very specific locations, allowing for instance for a more natural appearance of the decor of e.g. pronounced wooden or porous stone images.

Yet further, the amount needed to achieve maximum height difference is lower than with conventional (rotogravure) printing, thereby reducing the total amount of foam inhibiting agent required. At the same time, the resolution of the chemically embossed areas could be increased commensurate to the resolution of the digital printing or a rotogravure printing technique. The resolution of the chemical embossed or embossing pattern is preferably in the range of from 100 to 1200 dpi, more preferably of from 300 to 1000 dpi and even more preferably between 360 and 600 dpi.

The digitally printed material or a rotogravure printed material containing the foam inhibiting agent may optionally comprise ink (containing pigment(s) or dyes). In a preferred embodiment, the digitally printed material or a rotogravure printed material containing the foam inhibiting agent is free from ink.

The digital printing or a rotogravure printing of a foam inhibiting agent allows the location and depth of the chemical embossing to be chosen independently from the application of a decorative pattern. Hence, the designer may achieve a hitherto unknown design freedom, allowing to create previously unachievable gradients and structures, with an unprecedented resolution of both the relief, as well as the decor applied thereto. Yet further, the relief of the resilient co-foamed fused layer after foam expansion by a chemical blowing agent may be designed to mirror complex patterns, while reducing or even avoiding repetition. A further advantage resides in the fact that the decorative image and the chemically embossed surface pattern are effectively uncoupled and can be defined independently.

The use of digital printing techniques for the deposition of the discontinuous chemical embossing pattern allows a higher degree of flexibility for the application of decorative images, herein referred to as "decorative layer" that can be applied on the upper surface of the gelled co-foamable layer as compared to analogue printing techniques.

Moreover, naturally occurring images may be scanned using an optical and/or laser scanning system and uploaded in a database, thereby also taking into account the surface structure. The structure and image can then be further processed using image processing software, which may then be respectively applied as a chemically embossing pattern and a decorative layer to the top surface of the gelled co-foamable layer using a digital printing or a rotogravure printing technique. The devices used for the digital printing, for example an inkjet printer, may then be provided with a software that contains a database comprising, for example, different types of wood or stone patterns and surface struc-tures, or any other decor designs.

The decorative layer may be printed using inks containing pigments or dyes. This may be done using conventional printing techniques, such as rotogravure printing.

Alternatively, part or all of the decorative layer may be printed by digital printing processes. The chemical emboss-ing pattern and the decorative layer may also be printed intermittently.

The decorative layer preferably comprises continuously or discontinuously deposited ink forming a decorative image. More preferably, the decorative layer comprises digitally printed dots of ink forming a decorative image, preferably with a resolution in the range of from 100 to 4800 DPI, preferably in the same or higher resolution than the chemical embossing pattern.

Preferably, a digital printing process is employed for the decorative layer, preferably using so-called black, cyan, magenta and yellow inks.

In a preferred embodiment, the decorative layer is printed using inkjet printing. Preferably, radiation curable, more preferably UV-curable inks, are used whereby said UV-curable ink is at least partially cured using UV light shortly (preferably within 5 seconds) after printing.

It has been found that inhibitor dots printed under the decorative layer resulted in sharper patterns, whereas inhibi-tor dots printed over the decorative layer resulted in softer patterns. The ink is preferably directly cured after the deposition by printing, i.e. within 5 seconds or less.

The inks employed in the present process may be any suitable digitally printable inks, as long as they are compat-ible with the foam inhibiting agent and the gelled co-foamable layer. The ink typically includes a liquid vehicle and one or more solids, such as dyes or pigments and polymers.

UV-curable inkjet printable inks were found to be par-ticularly useful. The ink preferably comprises one or more photo-initiators in a suitable amount and suitable decompo-sition absorption spectrum. In the present process, any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a domi-nant wavelength of 300-410 nm, more preferably an ultra-violet LED. Yet more specifically, a UV-A light source, more preferably a UV-A LED is preferred due to the reduced light scattering therewith resulting in more efficient interior cur-ing.

It has been found that by separately printing an inhibiting agent, independently from the ink, a foam expanded relief can be achieved independently from the printed image.

Moreover, it has been found that ink dots with a certain pigmentation and frequency of dots at a certain area, com-bined with independently printed inhibitor agent dots, allowed to achieve a stronger effect on the reduction of foam expansion as compared to solely printed inhibitor agent dots.

In particular, a digitally printed UV-curing foam expan-sion inhibitor may advantageously be applied in the neces-sary amount and activity to result in a maximum inhibition effect, for instance in the order of 0.25 to 0.3 mm depth.

One limitation for first embodiment can be that the subsequent application of a print is influenced, possibly for example resulting in a less sharp/detailed print. A second limitation can be that the chemical inhibition in the gelled co-foamable layer is less compared to a traditional decor layer due to a lower blow ratio factor. With the second embodiment this is not an issue as there is another coating layer applied to the gelled co-foamable layer.

In a preferred embodiment of the present invention, a wear resistant layer is provided over the decorative layer and/or the chemically embossed relief pattern. Preferably, the wear resistant layer is provided over the major surface of the decorative layer, and more preferably over the entire surface of the decorative layer. The wear resistant layer may comprise any suitable material known in the art, such as a polymeric film or a plastisol coating. In one embodiment, the wear resistant layer comprises one or more layers of a polymeric material, such as a thermoplastic and/or thermo-set material. In one embodiment, the wear resistant layer comprises a transparent polyvinyl chloride layer. Other examples of the wear resistant layer include, but are not limited to, acrylic polymers, polyolefins, and the like. The wear resistant layer is however at least translucent, and preferably transparent. The wear resistant layer has a thick-ness of 100 μm to 700 μm.

Surprisingly, the adhesion of the wear resistant layer to the remainder of the multi-layer substrate may be better with a digitally printed foam inhibiting agent as compared to conventionally printed chemical inhibitor. Preferably, the substrate exhibits a peel strength between the decorative layer and the wear resistant layer between 40 to 100 N/50 mm, more preferably of from 45 to 95 N/50 mm, and most preferably of from 50 to 90 N/50 mm, when measured for complete product build-up including a wear resistant layer and determined according to EN 431:1994.

The wear resistant layer can be mechanically embossed.

A finishing top coat or lacquer may be provided onto the top surface of the wear resistant layer. They allow for an improved scratch resistance and determine the gloss of the final panel. The top coat or lacquer may be a polyurethane or an acrylic polymeric layer.

A backing layer is not an essential element of the present invention in embodiments of the second set. It can be provided adjacent and adhered to the lower surface of the support layer. Preferably, the backing layer comprises a synthetic material, preferably a vinyl-based polymer such as polyvinyl chloride. In a preferred embodiment, said backing layer comprises a synthetic foam material, and more specific a resilient, soft foam material such as soft polyvinyl chlo-ride. Preferably, said soft polyvinyl chloride foam material has a surface weight between 200 gsm and 1800 gsm, more preferably between 300 gsm and 1300 gsm. Preferably, said soft polyvinyl chloride foam material has a thickness between 0.2 mm to 3.0 mm, more preferably between 0.3 mm to 2.0 mm. Said backing layer may further comprise reinforcement fibers woven or no-woven materials including mineral fibers, such as glass fibers or synthetic fibers such as polyester fibers, preferably in an amount of 1 wt. % to 20 wt. %, based on the total weight of said backing layer, and more preferably in an amount of 2 wt. % to 5 wt. %.

In a further aspect, the present invention relates to a floor or wall panel wherein the foregoing multilayer sheet is applied as a top layer and adhered to a base panel.

The base panel can have or be dimensioned to any suitable length and/or width and can be provided in any shape, such as a rounded shape and a polygonal shape (triangle, rectangle, square, pentagon, hexagon, heptagon or octagon). The base panel can be provided in the shape of a rectangle, with short sides having a width of from 10 cm to 50 cm, preferably from 10 cm to 30 cm, and long sides having a length of from 50 cm to 300 cm, preferably from 80 cm to 250 cm. The base panel can also be provided in the shape of a square (tile) with a side length of from 20 cm to 100 cm, preferably from 25 cm to 80 cm, more preferably from 30 cm to 60 cm. Accordingly, the multi-layer substrate of the present invention is to be cut in the appropriate dimensions so as to perfectly fit as a top layer on the base panel.

The base panel may be wood-based (e.g. a fiberboard (MDF, HDF) or a particle board), or may comprise at least one layer of a wood-based material.

The substrate may also be made of, or at least comprising, a layer of synthetic material (as described hereinbefore) and, optionally, a filler material, and which may optionally be foamed. A synthetic material compound used to form the base panel can be a vinyl or PVC powder compound that has good impact strength, ease of processing, high extrusion rate, good surface properties, excellent dimensional stability and indentation resistance.

The base panel may also comprise composite materials, or one or more layers thereof, such as wood-plastic composites (WPC), referring to a composite structure comprising a wood-based material and a synthetic material, which, optionally, may be foamed.

The base panel may comprise interlocking means for mechanically joining adjacent floor or wall panels. Locking systems have been widely used for many years and are well known to the artisan. Most popular locking systems are glueless locking systems where both horizontal and vertical locking of the panels are realized with a tongue along one (edge) side and a groove along the opposite (edge) side of the panel. Typically, tongue and groove locking systems are integrally made with the panel. An alternative locking system comprises a plurality of staggered hooking tongues, extending outwardly from the edges of the panel. Such a system is for example described in European patent application number 14164155.5, assigned to Berry Alloc NV. Process:

The present invention also relates to a process of preparing the substrate or a sheet, comprising the steps of:

a) providing a support layer having an upper surface and a lower surface; and b) depositing a co-foamable layer to the upper surface of the support layer; and gelling the co-foamable layer;

c) optionally applying a decor layer to the gelled co-foamable layer;

d) applying a discontinuous chemical embossing pattern comprising single or stacked dots of a digitally printed material or a rotogravure printed material comprising a foam inhibiting agent on the upper surface of the gelled co-foamable layer or decor layer, and optionally, e) applying a decorative layer to the upper surface of the gelled co-foamable layer or the decor layer comprising the chemical embossing pattern, foaming the gelled co-foamable layer with a chemical blowing agent and fusing the gelled co-foamable layer, f) applying a wear layer, optionally mechanically embossing the wear layer;

g) optionally applying a lacquer.

The co-foamable layer can be a gelled froth such as a gelled vinyl froth. This will be co-foamed with a chemically foamed single layer. In the final product, the co-foamed layer can be a solidified froth such as a solidified vinyl froth co-foamed with a chemically foamed vinyl in a single layer.

The present process allows various variations of the way the inhibitor may be printed: It may, for instance, be printed in a separate operation onto the co-foamable layer. This may then be followed by a conventional build-up of decorative layer by normal printing processes. Advantageously, however, part or all of the decoration may also be printed digitally, preferably by using different print heads for inhibitor and pigmented ink in a combined or single print operation. In this case the inhibitor may be printed in the same printing operation with the decor layer, resulting in a digitally printed discontinuous layer comprising both the image as well as the chemical embossing pattern.

Inkjet printing is preferably used for the printing of the chemical embossing pattern as well as the decorative layer. A print head comprising the foam inhibiting agent is preferably combined with other print heads comprising only ink in an array of print heads, and wherein the foam inhibiting agent and the inks are digitally printed as part of a single printing operation. The foam inhibiting agent may be printed above, underneath, alongside and/or between the ink dots. The inkjet printing head normally scans back and forth in a transversal direction across the surface of the gelled co-foamable layer. It is allowed that the inkjet print head does not print on the way back, but bi-directional printing is preferred for obtaining a high area throughput. A preferred printing method is a "single pass printing process", which can be performed by using a substrate-wide array of inkjet printing heads or multiple staggered inkjet printing heads which cover the entire width of the surface. In a single pass printing process, the inkjet printing heads usually remain stationary and the printable surface is continuously transported under the inkjet printing heads.

The digitally printed material or a rotogravure printed material preferably comprises a radiation-curable binder material, the foam inhibiting agent and, optionally, a radiation-curable ink; and curing within 5 seconds after printing thereof. Preferably, the decorative layer is at least partially formed by digitally printing dots of radiation-curable ink, and curing within 5 seconds after printing thereof. Curing is preferably performed using UV-light, more preferably LED-UV.

Chemical foaming of the co-foamable layer is initiated through thermal treatment at earliest after deposition and at least partially curing of the foam inhibiting agent and the decorative layer. Preferably, the foaming is performed at the end of the process before top coat or lacquer are applied.

An exemplary process is described below:

A continuous glass fiber mat is fed into a coating line.

At the impregnation station, the glass mat is saturated with a co-foamable vinyl or PVC plastisol composition which has been mechanically foamed and which is subsequently gelled by heating. The co-foamable vinyl or PVC plastisol layer can be applied by knife over roll process and subsequently gelled by heating. The thus prepared sheet-like material may then be taken up on a take up roll, or the process directly continued.

In a separate, or in-line operation, the sheet-like material system is fed through a printing line where at a first station an inhibition material in a discontinuous pattern is applied by digital printing or rotogravure printing onto the gelled co-foamable layer or a separate decor layer.

In the printing line a decorative pattern is further printed on the sheet-like material by means of an array of digital print heads.

The printed patterns can be cured by means of a UV lamp, yielding the substrate.

In a further separate coating step of the process, a clear wear resistant layer can be applied to the gelled co-foamable layer by coating and subsequent gelling through heating. The wear layer may be mechanically embossed.

Also, a backing layer may be applied by coating.

Then, in an oven, which is heated to 190° C. the final gelling and fusing of each layer occurs and the co-foamable layer expands, thereby creating the chemically embossed relief pattern, yielding a sheet.

Preferably, in the process, a dedicated print head for applying the foam inhibiting agent is combined with other print heads applying only ink in an array of print heads. Herein, the foam inhibiting agent and the inks are digitally printed as part of a single printing operation.

The present invention further also relates to a system for performing the digital printing process. The system preferably comprises a server, a database, operatively connected to the server and configured to store one or more patterns for deposition of foam inhibitor agent to form a chemically formed embossing layer of a multilayer sheet suitable as floor or wall covering, multilayer sheet comprising a gelled co-foamable layer, a module, operatively connected to the server, for uploading one or more customized patterns and for storing the patterns in the database; a digital printer, operatively connected to the server, configured to print the one or more customized pattern(s) for the chemical embossing of the gelled co-foamable layer.

The invention claimed is:

1. A multi-layered sheet suitable as a floor or wall covering, comprising:

a porous support layer having an upper surface and a lower surface;

a co-foamed vinyl layer having an upper surface and a lower surface, the lower surface of the co-foamed vinyl layer being provided adjacent to the porous support layer, and a decorative layer on the upper surface of the co-foamed vinyl layer, wherein the co-foamed vinyl layer is impregnated into the porous support layer and through the porous support layer to form a backing layer on a side of the porous support layer opposite from the decorative layer, wherein the co-foamed vinyl layer comprises a mixed combination of a froth and a chemically blown foam in one layer, or the co-foamed vinyl layer is a gelled and fused plastisol that has been frothed and chemically blown by a chemical foaming agent in one layer, and wherein the co-foamed vinyl layer comprises in the one layer a first type of polyvinyl chloride ("PVC") that forms the froth and has a higher molecular weight, and a second type of PVC that forms the chemically blown foam and has a lower molecular weight, the second type of PVC being different from the first type of PVC.

2. The multi-layered sheet according to claim 1, wherein a range of air permeability at 100 Pascal of the porous support layer is 1000-5000 $l/m^2$.

3. The multi-layered sheet according to claim 1, wherein the decorative layer further comprises a discontinuous chemically embossed relief pattern on an upper surface of the co-foamed vinyl layer.

4. The multi-layered sheet according to claim 3, wherein the discontinuous chemically embossed relief pattern comprises indentations formed by single or stacked dots of a digitally printed material or a rotogravure printed material comprising a foam inhibiting agent.

5. The multi-layered sheet according to claim 1, wherein the decorative layer is adhered to the upper surface of the co-foamed vinyl layer.

6. The multi-layered sheet according to claim 1, wherein the porous support layer does not comprise paper.

7. The multi-layered sheet suitable as a floor or wall covering of claim 1, wherein the co-foamed vinyl layer includes a blowing agent inhibited by a foaming inhibitor.

8. The multi-layered sheet suitable as a floor or wall covering of claim 7, wherein the foaming inhibitor includes a curable binder material that is at least partially cured in the co-foamed vinyl layer.

9. The multi-layered sheet suitable as a floor or wall covering of claim 1, wherein the backing layer is on a bottom side of the multi-layered sheet.

10. The multi-layered sheet suitable as a floor or wall covering of claim 1, wherein the co-foamed vinyl layer is frothed before the co-foamed vinyl layer is provided adjacent to the porous support layer, and then chemically foamed when on the porous support layer to form the chemically blown foam.

11. The multi-layered sheet suitable as a floor or wall covering of claim 1, wherein the backing, extends to a bottom side of the multi-layered sheet and further extends for a thickness below the porous support layer.

12. The multi-layered sheet suitable as a floor or wall covering of claim 1, wherein the first type of PVC has a K-value higher than 68, and the second type of PVC has a K-value of 60-70.

* * * * *